United States Patent
Cui et al.

(10) Patent No.: US 11,442,459 B2
(45) Date of Patent: Sep. 13, 2022

(54) SYSTEMS AND METHODS FOR TRAINING PREDICTIVE MODELS FOR AUTONOMOUS DEVICES

(71) Applicant: UATC, LLC, San Francisco, CA (US)

(72) Inventors: Henggang Cui, Allison Park, PA (US); Junheng Wang, North York (CA); Sai Bhargav Yalamanchi, Pittsburgh, PA (US); Mohana Prasad Sathya Moorthy, San Francisco, CA (US); Fang-Chieh Chou, San Francisco, CA (US); Nemanja Djuric, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 295 days.

(21) Appl. No.: 16/783,762

(22) Filed: Feb. 6, 2020

(65) Prior Publication Data

US 2021/0181754 A1 Jun. 17, 2021

Related U.S. Application Data

(60) Provisional application No. 62/946,512, filed on Dec. 11, 2019.

(51) Int. Cl.
*G05D 1/02* (2020.01)
*G06N 20/00* (2019.01)
(Continued)

(52) U.S. Cl.
CPC ....... *G05D 1/0221* (2013.01); *B60W 60/0011* (2020.02); *G06N 3/084* (2013.01); *G06N 20/00* (2019.01); *G05D 2201/0213* (2013.01)

(58) Field of Classification Search
None
See application file for complete search history.

(56) References Cited

U.S. PATENT DOCUMENTS

| | | | |
|---|---|---|---|
| 2020/0409378 A1* | 12/2020 | Benisch | G05D 1/0088 |
| 2021/0042664 A1* | 2/2021 | Wang | G06K 9/6276 |
| 2021/0173402 A1* | 6/2021 | Chang | B60W 40/09 |

OTHER PUBLICATIONS

Medium, "Learning to Predict Other Vehicles' Trajectories for Safe Autonomous Driving", Jul. 19, 2019, https://medium.com/@hello_isee/learning-to-predict-other-vehicles-trajectories-for-safe-autonomous-driving-cbfb1b8053a4, retrieved on Feb. 4, 2020, 6 pages.

* cited by examiner

*Primary Examiner* — James M McPherson
*Assistant Examiner* — Bakari Underwood
(74) *Attorney, Agent, or Firm* — Dority & Manning, P.A.

(57) ABSTRACT

Systems and methods for training machine-learned models are provided. A method can include receiving a rasterized image associated with a training object and generating a predicted trajectory of the training object by inputting the rasterized image into a first machine-learned model. The method can include converting the predicted trajectory into a rasterized trajectory that spatially corresponds to the rasterized image. The method can include utilizing a second machine-learned model to determine an accuracy of the predicted trajectory based on the rasterized trajectory. The method can include determining an overall loss for the first machine-learned model based on the accuracy of the predictive trajectory as determined by the second machine-learned model. The method can include training the first machine-learned model by minimizing the overall loss for the first machine-learned model.

20 Claims, 10 Drawing Sheets

(51) Int. Cl.
*B60W 60/00* (2020.01)
*G06N 3/08* (2006.01)

SYSTEMS AND METHODS FOR TRAINING PREDICTIVE MODELS FOR AUTONOMOUS DEVICES

RELATED APPLICATION

The present application is based on and claims benefit of U.S. Provisional Patent Application No. 62/946,512 having a filing date of Dec. 11, 2019, which is incorporated by reference herein.

FIELD

The present disclosure relates generally to machine-learned predictive models that are trained to predict object trajectories.

BACKGROUND

Robots, including autonomous vehicles, can receive data that is used to determine a predicted trajectory for objects in an environment through which the robot travels. Robots can rely on predicted trajectories to perform various operations. Thus, effective operation of a robot may depend on the accuracy of the determination of the predicted trajectory.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method for training a machine-learned model. The method includes receiving, by a computing system comprising one or more computing devices, a rasterized image associated with a training object. The method includes generating, by the computing system, a predicted trajectory of the training object by inputting the rasterized image into a machine-learned prediction generator model configured to output the predicted trajectory. The method includes converting, by the computing system, the predicted trajectory into a rasterized trajectory. The rasterized trajectory can spatially correspond to the rasterized image. The method includes determining, by the computing system, a loss score for the predicted trajectory by inputting the rasterized trajectory and the rasterized image into a machine-learned discriminator model configured to output the loss score for the predicted trajectory. The method includes determining, by the computing system, an overall loss for the machine-learned prediction generator model based, at least in part, on the loss score. And, the method includes training, by the computing system, the machine-learned prediction generator model by minimizing the overall loss for the machine-learned prediction generator model.

Another example aspect of the present disclosure is directed to a computing system including one or one or more processors and one or more tangible, non-transitory, computer readable media that collectively store instructions that when executed by the one or more processors cause the computing system to perform operations. The operations include obtaining a rasterized image from a set of training data. In addition, the operations include generating a predicted trajectory for a training object by inputting the rasterized image into a machine-learned prediction generator model. The operations include converting the predicted trajectory into a rasterized trajectory. The rasterized trajectory spatially corresponds to the rasterized image. The operations include determining a loss score for the predicted trajectory by inputting the rasterized trajectory and the rasterized image into a machine-learned discriminator model configured to output the loss score for the predicted trajectory. The operation include determining an overall loss for the machine-learned prediction generator model based, at least in part, on the loss score. And, the operation include training the machine-learned prediction generator model by minimizing the overall loss for the machine-learned prediction generator model.

Yet another example aspect of the present disclosure is directed to another computing system. The computing system includes a machine-learned prediction generator model configured to receive a rasterized image associated with a training object, and in response to receipt of the rasterized image, output a predicted trajectory of the training object. In addition, the computing system includes a differential rasterizer configured to receive a predicted trajectory, and in response to receipt of the predicted trajectory, convert the predicted trajectory into a rasterized trajectory. The computing system includes a machine-learned discriminator model configured to receive the rasterized trajectory and the rasterized image, and in response to receipt of the rasterized trajectory and rasterized image, output a loss score for the predicted trajectory. The computing system also includes a memory that stores a set of instructions; and one or more processors which use the set of instructions. The set of instructions are used to receive the rasterized image associated with the training object. In addition, the set of instructions are used to generate the predicted trajectory of the training object by inputting the rasterized image into the machine-learned prediction generator model. The set of instructions are used to convert the predicted trajectory into the rasterized trajectory by inputting the predicted trajectory into the differential rasterizer. The set of instructions are used to determine the loss score for the predicted trajectory by inputting the rasterized trajectory and the rasterized image into the machine-learned discriminator model. The set of instructions are used to determine an overall loss for the machine-learned prediction generator model based, at least in part, on the loss score. And, the set of instructions are used to train the machine-learned prediction generator model by minimizing the overall loss for the machine-learned prediction generator model.

Other example aspects of the present disclosure are directed to other systems, methods, vehicles, apparatuses, tangible non-transitory computer-readable media, and devices for motion prediction and/or operation of a device including a vehicle.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
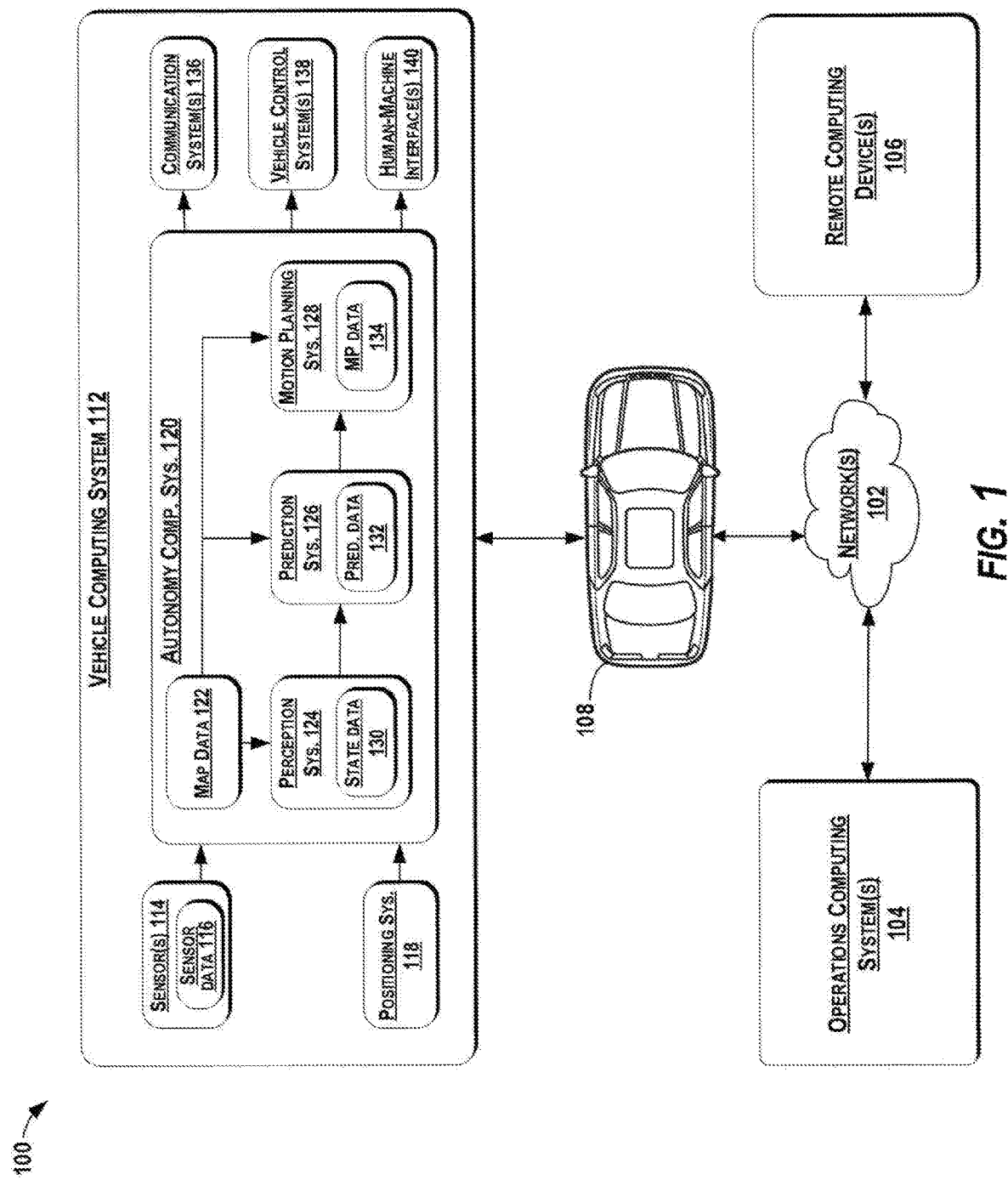
FIG. 1 depicts a diagram of an example system according to example embodiments of the present disclosure.

Example aspects of the present disclosure are directed to determining predicted trajectories for one or more objects in an environment proximate to a vehicle. For example, the present disclosure describes the prediction of motion and the determination of trajectories for objects including vehicles, pedestrians, and/or cyclists in the environment surrounding an autonomous vehicle, a semi-autonomous vehicle, and/or a manually operated vehicle. Further, aspects of the present disclosure are also directed to the use of machine-learned models that can be trained to predict the motion of objects including the trajectories and locations of objects at some time in the future.

Aspects of the present disclosure are directed to improved systems and methods for training machine-learning models such as, for example, predictive models for motion planning in the autonomous vehicle context using generative adversarial networks (GANs). An autonomy system for an autonomous vehicle can include a prediction system configured to predict future trajectories for objects within an environment. To do so, the prediction system can utilize various predictive machine-learned models (e.g., a generative model such as a machine-learned prediction generator model). The predictive models can be trained to output a predicted future trajectory (e.g., a number of future locations) for an object, the accuracy of which can be crucial for the safe operation of an autonomous vehicle. To increase the accuracy of the predictive models, another machine-learned model (e.g., an adversarial model such as a machine-learned discriminator model) can be used to train the predictive model (e.g., in a generative-adversarial network). In this regard, a rasterized image (e.g., a BEV image encoded with object features) associated with a training object can be received and input into a prediction model to generate a predicted trajectory. The predicted trajectory can be converted into a rasterized trajectory such that predicted trajectory spatially corresponds to the rasterized image, as further described herein. The rasterized trajectory and the rasterized image can be input into an adversarial model to determine a loss score (e.g., a measure of how accurate the predicted trajectory is). An overall loss for the predictive model can be learned by averaging the loss scores for a plurality of predicted trajectories output by the predictive model.

The predictive and adversarial models can be trained end-to-end (e.g., via backpropagation) based on the overall loss (e.g., predictive model trained to minimize loss, adversarial model trained to maximize loss, etc.). In this manner, the predictive model can be trained based on a loss function that increases with the sophistication of the model. Moreover, the speed and efficiency of training predictive models can be increased by converting the predicted trajectory into the same image space as the rasterized image. In this manner, a differentiable input to and output from the adversarial model can be created. This, in turn, allows the output from the adversarial model to coherently flow back to the predictive model for use in updating parameters during training.

The following describes the technology of this disclosure within the context of an autonomous vehicle for example purposes only. As described herein, the technology described herein is not limited to an autonomous vehicle and can be implemented within other robotic and computing systems, such as those utilizing predictive machine-learned models.

An autonomous vehicle can include a computing system (e.g., a vehicle computing system) with a variety of components for operating with minimal and/or no interaction from a human operator. For example, the computing system can be located onboard the autonomous vehicle and include one or more sensors (e.g., cameras, Light Detection and Ranging (LIDAR), Radio Detection and Ranging (RADAR), etc.), an autonomy computing system (e.g., for determining autonomous navigation), one or more vehicle control systems (e.g., for controlling braking, steering, powertrain), etc. The autonomy computing system can include a number of sub-systems that cooperate to perceive the surrounding environment of the autonomous vehicle and determine a motion plan for controlling the motion of the autonomous vehicle.

For example, the autonomy computing system can include a perception system configured to perceive one or more objects within the surrounding environment of the autonomous vehicle, a prediction system configured to predict a motion of the object(s) within the surrounding environment of the autonomous vehicle, and a motion planning system configured to plan the motion of the autonomous vehicle with respect to the object(s) within the surrounding environment of the autonomous vehicle.

In some implementations, each of the subsystems can utilize one or more machine-learned models. For example, the prediction system can determine a predicted trajectory (e.g., a predicted path, one or more predicted future locations, etc.) along which a respective object is predicted to travel over time based on one or more machine-learned models. By way of example, the prediction system can generate such predictions by including, employing, and/or otherwise leveraging a machine-learned prediction generator model.

For example, the prediction system can receive state data (e.g., from a perception system) associated with one or more objects within the surrounding environment of the autonomous vehicle. The prediction system can input the state data (e.g., BEV image, LIDAR data, etc.) into the machine-learned prediction generator model to determine trajectories of the one or more objects based on the state data associated with each object. For example, the machine-learned prediction generator model can be previously trained to output a future trajectory (e.g., a future path, one or more future geographic locations, etc.) of an object within a surrounding environment of the autonomous vehicle. In this manner, the prediction system can determine the future trajectory of the object within the surrounding environment of the autonomous vehicle based, at least in part, on the machine-learned prediction generator model.

The machine-learned prediction generator model can be previously trained via one or more machine-learning techniques. In some implementations, the machine-learned prediction generator model can be previously trained by one or more devices (e.g., remote servers, operations computing system, etc.) remote from the autonomous vehicle. For example, the machine-learned prediction generator model can include a generative network in a generative-adversarial network. For instance, the machine-learned prediction generator model can be trained, via backpropagation techniques, to minimize a loss generated by an adversarial network (e.g., a machine-learned discriminator model) of the generative-adversarial network.

For example, the machine-learned prediction generator model can be trained in preparation for use by a prediction system of an autonomous vehicle while online. The machine-learned prediction generator model can be trained in one or more devices remote from the autonomous vehicle. For instance, in some implementations, the machine-learned prediction generator model can be trained by a training computing system remote from the autonomous vehicle. By way of example, the training computing system can include and/or be a component of an operations computing system configured to monitor and communicate with an autonomous vehicle. In addition, or alternatively, the training computing system can include and/or be a component of one or more remote computing device such as, for example, one or more remote servers configured to communicate with an autonomous vehicle.

The training computing system can receive training data associated with a training object. The training data can include camera images, raw RADAR data, raw LIDAR data, and/or data from one or more other system (e.g., state data including velocity data, acceleration data, heading data, and/or other features). For instance, the training computing system can receive a rasterized image associated with a training object. The rasterized image can be received from a set of training data indicative of one or more previously observed objects. For example, the set of training data can include a plurality of sensor observations of a plurality of training objects traversing a plurality of paths at a plurality of velocities, a plurality of accelerations, etc. The set of training data can be stored in a training database in one or more memory devices. For example, the set of training data can be stored in one or more memory devices of the training computing system. In addition, or alternatively, the set of training data can be stored onboard one or more autonomous vehicles, at an operations computing system, one or more remote computing devices (one or more remote servers), etc.

In some implementations, the set of training data can be previously collected by a plurality of autonomous vehicles. For example, the training computing system can be associated with a plurality of autonomous vehicles. Each of the plurality of autonomous vehicle can include one or more sensors configured to obtain observations of the plurality of training objects. The plurality of autonomous vehicles can be configured to collect and store the plurality of observations. In addition, or alternatively, the plurality of autonomous vehicles can be configured to upload the plurality of observations to one or more remote memory devices (e.g., memory device(s) of the training computing system, etc.). In this manner, autonomous vehicles can be utilized to generate a robust data set indicative of a plurality of real life object trajectories.

In some implementations, the set of training data can include one or more preprocessed rasterized images (e.g., RGB images). For example, a computing system can generate a rasterized image of an environment based on one or more sensor observations of a training object. For instance, the rasterized image can include a top-view image (e.g., BEV image) including one or more sensor observations of the training object and the surrounding environment. By way of example, the one or more sensor observations can include multiple channels indicative of one of more features of the object (e.g., color, type, speed, etc.) and/or features of the surrounding environment (e.g., temporal features, spatial features (e.g., portion of the image, map data, etc.), etc.). The rasterized image can be fused with the one or more features of the object and/or surrounding environment. Accordingly, the rasterized image can include an image (e.g., RGB image, BEV image, etc.) encoded with the one or more sensor observations. In this manner, the rasterized image can include data indicative of one or more features of the training object.

The training computing system can receive a rasterized image associated with a training object from the set of training data. In addition, or alternatively, the training computing system can generate the rasterized image based, at least in part, on the set of training data. By way of example, the set of training data can include a plurality of images (e.g., RGB images, BEV images, etc.) and a plurality of sensor observations including multiple channels indicative of one or more features of the training object and/or the surrounding environment of the training object. The training computing system can generate the rasterized image from the set of training data based, at least in part, on the one or more image(s) and/or the sensor observations of the training object included in the set of training data.

The training computing system can generate a predicted trajectory of the training object based, at least in part, on the rasterized image. For example, the training computing system can input the rasterized image into the machine-learned prediction generator model. The machine-learned prediction generator model can be configured to output a predicted trajectory based on the rasterized image. The predicted trajectory can include a plurality of future locations associated with the training object. For example, the predicted trajectory can include a plurality of waypoints, each of which can be indicative of a future location of the object.

In some implementations, the set of training data can include one or more ground truths indicative of previously observed object trajectories. For example, the set of training data can include observations of the training object at one or more first and second points in time. For example, the one or more second points in time can be points in time occurring after the one or more first points in time. The rasterized image input into the machine-learned prediction generator model can be associated with one or more images corresponding to the one or more first points in time. The predicted trajectory can include a plurality of waypoints for the training object at the one or more second points in time. In some implementations, the one or more observations of the set of training data at the one or more second points in time can be used as a ground truth for the predicted trajectory. In this manner, a machine-learned model can be trained to distinguish between a generated trajectory such as, for example, the predicted trajectory and a real trajectory based on real life observations.

In some implementations, the training computing system can determine one or more predicted control inputs for the training object. For example, the training computing system can determine the one or more predicted control inputs for the object by inputting the rasterized image and the predicted trajectory for the object into a machine-learned motion model. For instance, the machine-learned motion model can be configured to output the one or more predicted control inputs based, at least in part, on the data indicative of the one or more features of the object and the predicted trajectory. For example, the one or more control inputs can include an input to a control device of the training object. By way of example, the one or more control inputs can include a control input to a steering wheel of the training object that is used to determine the direction of travel of the training object. These predicted control inputs can be used in conjunction with the predicted trajectory to determine a more accurate representation of a future state of the training object.

The machine-learned motion model can include at least one of a convolutional neural network, a recurrent neural network, a recursive neural network, a decision tree, logistic regression model, and/or a support vector machine. In some implementations, the machine-learned motion model can include a machine-learned kinematics model. The kinematics model can be trained to generate control inputs associated with the motion of the object, based at least in part, on the type of object. For example, the kinematics model can generate different control inputs for an object that is a vehicle than for an object that is a bicycle/motorcycle. In some implementations, the kinematics model can use the one or more physical constraints of the one or more objects to determine the occurrence of events such as wheel slippage when a wheeled object loses traction with a road surface (e.g., traction loss due to a slippery road surface), thereby resulting in a more realistic and accurate prediction of the future location of an object in motion. The control inputs generated by the kinematics model can be used to refine the predicted trajectory to more accurately reflect the motion of the type of object.

The training computing system can convert the predicted trajectory into a rasterized trajectory. For example, the predicted trajectory can include a plurality of future locations of an object that do not spatially correspond to the rasterized image. For instance, the rasterized image can correspond to a particular three-dimensional area. By way of example, the rasterized image can include a plurality of pixels, each of which corresponding to one or more pixel coordinates of a three-dimensional area such as, for example, a three-dimensional area of an image. In addition, or alternatively, the predicted trajectory can include a plurality of waypoints, each of which corresponding to a different three-dimensional area. For example, the predicted trajectory can include a plurality of waypoints represented in a format, such that it is usable by a motion planning system of an autonomous vehicle. For example, in some implementations, a format preferable for use by the motion planning system can be different than a format preferable for use by the machine-learned models such as, for example, the format of the rasterized image input into the machine-learned prediction generator model. For example, each of the plurality of waypoints of the predicted trajectory can correspond to one or more waypoint coordinates. In some implementations, the one or more waypoint coordinates can be indicative of a future location of the training object in the real world, whereas the one or more pixel coordinates can be indicative of one or more coordinates within a three-dimensional area of an image.

To increase the speed and efficiency of training machine-learned models, the training computing system can apply a differential rasterizer to the predicted trajectory to transform the predicted trajectory into the same image space as the rasterized image. For example, the differential rasterizer can be configured to output a rasterized trajectory based, at least in part, on a predicted trajectory input to the differential rasterizer. The differentiable rasterizer can include a differentiable function configured to map a pixel coordinate to an image. For example, the differentiable function can include a plurality of differentiable math operations (e.g., multiplication, addition, Gaussian, etc.). Moreover, in some implementations, the differentiable rasterizer can be configured to determine the gradient of an image with respect to the pixel coordinate. The gradient of the image with respect to the pixel coordinate can be indicative of a manner in which to change the pixel to reduce and/or increase loss at the machine-learned models. The differentiable rasterized can generate a rasterized trajectory including one or more waypoint coordinates mapped to the one or more images of the rasterized image. Each waypoint coordinate of the rasterized trajectory can include data indicative of one or more gradients associated with the one or more images. Such data can flow back from the discriminator to the generator (and/or from the generator to the discriminator) to improve training through backpropagation.

The training computing system (e.g., via the differentiable rasterizer) can determine one or more coordinates of the three-dimensional area (e.g., of at least one image) corresponding to the rasterized image for each respective waypoint in the plurality of waypoints of the predicted trajectory. For example, the training computing system can determine a pixel coordinate of an image for each waypoint coordinate of a respective waypoint in the plurality of waypoints of the predicted trajectory. The determined one or more coordinates (e.g., pixel coordinates of the at least one image) can be assigned to the respective waypoint. This can be repeated for each respective waypoint in the plurality of waypoints of the predicted trajectory until each respective waypoint is associated with one or more coordinates (e.g., pixel coordinates) of the three-dimensional area (e.g., of at least one image) corresponding to the rasterized image. In this manner, the differentiable rasterizer can generate a rasterized trajectory that spatially corresponds to the rasterized image.

The training computing system can determine an overall loss for the machine-learned prediction generator model. To do so, the training computing system can determine a loss score for the predicted trajectory by inputting the rasterized trajectory and the rasterized image into a machine-learned discriminator model. For example, the machine-learned discriminator model can be configured to output the loss score for the predicted trajectory. In addition, or alternatively, the loss score for the predicted trajectory can be based, at least in part, on the one or more predicted controls. For example, the training computing system can input the rasterized trajectory, the rasterized image, and/or the one or more predicted controls into the machine-learned discriminator model. In turn, the machine-learned discriminator model can be configured to output the loss score for the predicted trajectory and/or the one or more predicted controls for the predicted trajectory.

In some implementations, the machine-learned discriminator model can be pretrained. For example, the machine-learned discriminator model can be previously trained to distinguish between one or more generated trajectories (e.g., fake trajectories) output by the machine-learned prediction generator model and one or more ground truths (e.g., real trajectories) associated with the one or more generated trajectories. For example, the machine-learned prediction generator model can output a plurality of initial training trajectories. The plurality of initial training trajectories can be input into the machine-learned discriminator model with a plurality of ground truths and learned to distinguish between a generated trajectory (e.g., a predicted trajectory) and a real trajectory (e.g., a ground truth). In this manner, a strong machine-learned discriminator model can be trained so that it can consistently differentiate between trajectories generated by the machine-learned prediction generator model and ground truths based on real life observations before the machine-learned prediction generator model is trained based on a loss score generated by the machine-learned discriminator model.

The training computing system can determine an overall loss for the machine-learned prediction generator model based, at least in part, on the loss score output by the machine-learned discriminator model. For example, the loss score can include a value indicative of the truthfulness (e.g., how real the input looks) of the predicted trajectory. By way of example, in some implementations, the loss score can include a binary value. For instance, a loss score of one (e.g., "1") can be indicative of a real trajectory, whereas a loss score of zero (e.g., "0") can be indicative of a fake trajectory. In some implementations, the loss score can include a percentage indicative of a probability that the predicted trajectory is real (and/or fake). For example, a higher percentage can be indicative of higher chance that the predicted trajectory is real (and/or fake).

The overall loss for the machine-learned prediction generator model can be determined based on one or more losses (e.g., as determined by the machine-learned discriminator model, determined based on output from the machine-learned prediction generator model, etc.). By way of example, the overall loss can be determined based on losses of the output of the machine-learned prediction generator model such as, for example, L1 loss, L2 loss, etc. of predicted trajectories when compared to ground truths. In addition, or alternatively, the overall loss can be determined based on a plurality of loss scores determined for a plurality of predicted trajectories generated by the machine-learned prediction generator model.

For example, the training computing system can generate a plurality of different rasterized trajectories (e.g., each associated with a different predicted trajectory) and input the plurality of rasterized trajectories into the machine-learned discriminator model. In response, the machine-learned discriminator model can output a loss score for each trajectory. The overall loss can be determined based on an average loss score for the plurality of predicted trajectories. In this manner, the overall loss can be indicative of the probability that a predicted trajectory generated by the machine-learned prediction generator model is an accurate representation of a real life occurrence.

The training computing system can train the machine-learned prediction generator model by minimizing the overall loss for the machine-learned prediction generator model. For example, the training computing system can perform one or more machine-learning techniques (e.g., backpropagation) to learn the training computing system based on the overall loss. For instance, the training computing system can adjust the parameters of the machine-learned prediction generator model based, at least in part, on the overall loss. Moreover, the parameters of the machine-learned prediction generator model can be weighted in proportion to their contribution to decreasing the overall loss so that parameters that contribute more to reducing the loss are weighted more heavily. By way of example, the one or more parameters that do not change the overall loss (e.g., cause the loss to increase or decrease) may be kept the same (e.g., not adjusted), the one or more parameters that decrease the loss can be weighted more heavily (e.g., adjusted to increase their contribution to the loss), and the one or more parameters that increase the loss can have their weighting reduced (e.g., adjusted to reduce their contribution to the loss). In this manner, the adjustment of the one or more parameters of the machine-learned prediction generator model over a plurality of iterations can result in a lower loss that can correspond to more accurately predicted trajectories.

In some implementations, the machine-learned prediction generator model and the machine-learned discriminator model can be trained end-to-end via backpropagation based on the overall loss. By way of example, the machine-learned discriminator model can be trained to maximize the overall loss while the machine-learned prediction generator model can be trained to minimize the overall loss. For example, the training computing system can adjust one or more parameters of the machine-learned discriminator model in order to increase the overall loss.

In some implementations, the machine-learned discriminator model and the machine-learned prediction generator model can be trained at different rates. For example, the machine-learned discriminator model can be trained at a discriminator learning rate and the machine-learned prediction generator model can be trained at a prediction learning rate. In some implementations, the discriminator learning rate can be a higher multiple of the prediction learning rate. For example, the machine-learned discriminator model can be updated more times than the machine-learned prediction generator model to keep the machine-learned discriminator model stronger than the machine-learned prediction generator model. This can be beneficial, for example, as it can prevent the machine-learned prediction generator model from learning to exploit loopholes in a weaker machine-learned discriminator model.

For example, in some implementations, the discriminator learning rate can be more than two times the prediction learning rate and/or vice versa. By way of example, the machine-learned prediction generator model can be frozen (e.g., use the same parameters) during five cycles of backpropagation. During each cycle the machine-learned prediction generator model can output a plurality of trajectories (e.g., using the same parameters), and the machine-learned discriminator model can determine an overall loss for the plurality of trajectories and update its parameters to increase the overall loss throughout the cycle. After five cycles the machine-learned discriminator model can be frozen (e.g., use the same parameters) and the machine-learned prediction generator model can be unfrozen, for one cycle, during which the machine-learned prediction generator model can update its parameters to minimize the overall loss.

In addition, or alternatively, the training computing system can determine the discriminator learning rate based on a comparison between a threshold network loss (e.g., 50%, 70%, 90%, etc.) and the overall loss. The threshold network loss, for example, can be indicative of a threshold loss for the machine-learned models. The threshold network loss can include an average loss effective for training machine-learned models. The training computing system can freeze the machine-learned prediction generator model until the machine-learned discriminator model determines an overall loss above the threshold network loss. In this manner, the machine-learned prediction generator model can generate predicted trajectories based on the same parameters until the machine-learned discriminator model learns to identify the predicted trajectories as fake rather than real with reasonable consistency.

Example aspects of the present disclosure can provide a number of improvements to prediction computing technology and robotics computing technology such as, for example, prediction computing technology for autonomous driving. For instance, the systems and methods of the present disclosure provide an improved approach for training machine-learning prediction models such as those used to predict future trajectories of objects within a surrounding environment of the vehicle. For example, a computing system can receive a rasterized image associated with a training object from a set of training data. The computing system can generate a predicted trajectory of the training object by inputting the rasterized image into a machine-learned prediction generator model. The computing system can convert the predicted trajectory into a rasterized trajectory, where the rasterized trajectory spatially corresponds to the rasterized image. The computing system can determine a loss score for the predicted trajectory by inputting the rasterized trajectory and the rasterized image into a machine-learned discriminator model configured to output the loss score for the predicted trajectory. The computing system can determine an overall loss for the machine-learned prediction generator model based, at least in part, on the loss score. And, the computing system can train the machine-learned prediction generator model by minimizing the overall loss for the machine-learned prediction generator model. The machine-learned discriminator model can be discarded after training and the machine-learned prediction generator model can be utilized during operation of an autonomous vehicle. In this manner, the present disclosure presents an improved computing system that can effectively train a machine-learned model. The computing system employs improved generative-adversarial network techniques that leverage the benefits of differentiality by converting disparate data sets into comparable representations. As a result, the computing system is able to increase the speed and efficiency of training machine-learned models, generally, and generative-adversarial networks in particular. Moreover, by training different models of a network at different learning rates, the computing system is able to utilize machine-learning training techniques as a solution to novel problems in the realm of computer technology. In this manner, the computing system can accumulate and utilize newly available information such as, for example, different learning rates, rasterized trajectories, etc. to provide a practical improvement to machine-learning technology (e.g., machine-learning training technology). This, in turn, improves the functioning of machine-learning systems in general by increasing the speed and efficiency of training such systems. Ultimately, the training techniques disclosed herein result in more accurate machine-learned systems; thereby improving the predictions of machine-learned systems once deployed (e.g., in autonomous vehicles).

Furthermore, although aspects of the present disclosure focus on the application of training techniques described herein to predictive models utilized in autonomous vehicles, the systems and methods of the present disclosure can be used to train any machine-learned model. Thus, for example, the systems and methods of the present disclosure can be used to train machine-learned models configured for object detection, image processing, etc.

Various means can be configured to perform the methods and processes described herein. For example, a computing system can include data obtaining unit(s), prediction unit(s), differential unit(s), scoring unit(s), storing unit(s), loss unit(s), training unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., data obtaining unit(s), etc.) can be configured to obtain data, for example, such as a rasterized image associated with a training object.

The means (e.g., prediction unit(s), etc.) can be configured to generate a predicted trajectory of the training object. For example, the means (e.g., prediction unit(s), etc.) can include and/or otherwise have access to a machine-learned prediction generator model configured to output the predicted trajectory. In addition, the means (e.g., prediction unit(s), etc.) can include and/or otherwise have access to a machine-learned motion model configured to output one or more predicted control inputs based, at least in part, on data indicative of one or more features of a training object and/or a predicted trajectory for the training object.

The means (e.g., differential unit(s), etc.) can be configured to determine a rasterized trajectory based on the predicted trajectory. For example, the means (e.g., differential unit(s), etc.) can include and/or otherwise have access to a differential rasterized configured to convert the predicted trajectory into a rasterized trajectory. For instance, the rasterized trajectory can spatially correspond to the rasterized image. By way of example, the predicted trajectory can include a plurality of waypoints. Each waypoint can be indicative of a future location of the object. Converting the predicted trajectory into a rasterized trajectory can include, for example, applying a differentiable rasterizer to the predicted trajectory to transform the predicted trajectory into a same image space as the rasterized image. The rasterized image can include a plurality of pixels and each pixel of the plurality of pixels can correspond to one or more coordinates of a three-dimensional area. In some implementations, the means (e.g., differential unit(s), etc.) can be configured to, for each respective waypoint in the plurality of waypoints of the predicted trajectory, determine one or more coordinates of the three-dimensional area that correspond to the respective waypoint and assign the one or more coordinates to the respective waypoint.

The means (e.g., scoring unit(s)) can be configured to determine a loss score for the predicted trajectory. For example, the means (e.g., scoring unit(s), etc.) can include and/or otherwise have access to a machine-learned discriminator model configured to output the loss score for the predicted trajectory. For instance, means (e.g., scoring unit(s), etc.) can determine a loss score for the predicted trajectory by inputting the rasterized trajectory and the rasterized image into a machine-learned discriminator model configured to output the loss score for the predicted trajectory.

The means (e.g., storing unit(s), etc.) can be configured to store data. For example, the means (e.g., storing unit(s), etc.) can be configured to store the loss score for the predicted trajectory. In addition, or alternatively, the means (e.g., storing unit(s), etc.) can be configured to store image data in a set of training data. For example, the set of training data can be indicative of one or more previously observed objects. In addition, or alternatively, the set of training data can include one or more ground truths indicative of a previously observed object trajectory.

The means (e.g., loss unit(s), etc.) can be configured to determine an overall loss for the machine-learned prediction generator model. For example, the means (e.g., loss unit(s), etc.) can be configured to determine the overall loss based, at least in part, on the loss score.

The means (e.g., the training unit(s), etc.) can be configured to train the machine-learned prediction generator model. For example, the means (e.g., training unit(s), etc.) can be configured to train the machine-learned prediction generator model by minimizing the overall loss for the machine-learned prediction generator model. In some implementations, the means (e.g., training unit(s)) can be configured to train the machine-learned prediction generator model and the machine-learned discriminator model end-to-end via backpropagation based on the overall loss. By way of example, the machine-learned discriminator model can be trained at a discriminator learning rate and the machine-learned prediction generator model can be trained at a prediction learning rate. In some implementations, the discriminator learning rate can be a higher multiple of the prediction learning rate. For example, the means (training unit(s), etc.) can be configured to determine the discriminator learning rate based on a comparison between a threshold network loss and the overall loss. In addition, or alternatively, the means (training unit(s), etc.) can be configured to set the discriminator learning rate as five times the prediction learning rate. In addition, the mean(s) (e.g., training unit(s), etc.) can be further configured to train the machine-learned discriminator model to distinguish between generated trajectories and one or more ground truths.

Accordingly, the disclosed technology provides improved prediction of the locations of detected objects. Operational benefits of the disclosed technology include more accurate and faster motion prediction, improved scalability, reduced wear and tear on a vehicle, greater fuel efficiency, improved safety, and/or an overall improvement in the utilization of computational resources.

With reference now to FIGS. 1-10, example embodiments of the present disclosure will be discussed in further detail. FIG. 1 depicts an example system 100 overview according to example implementations of the present disclosure. As illustrated, FIG. 1 shows a system 100 that includes a communications network 102; an operations computing system 104; one or more remote computing devices 106; a vehicle 108; a vehicle computing system 112; one or more sensors 114; sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; and a human-machine interface 140.

The operations computing system 104 can be associated with a service provider that can provide one or more vehicle services to a plurality of users via a fleet of vehicles that includes, for example, the vehicle 108. The vehicle services can include transportation services (e.g., rideshare services), courier services, delivery services, and/or other types of services.

The operations computing system 104 can include multiple components for performing various operations and functions. For example, the operations computing system 104 can be configured to monitor and communicate with the vehicle 108 and/or its users to coordinate a vehicle service provided by the vehicle 108. To do so, the operations computing system 104 can communicate with the one or more remote computing devices 106 and/or the vehicle 108 via one or more communications networks including the communications network 102. The communications network 102 can send and/or receive signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 102 can include a local area network (e.g. intranet), wide area network (e.g. the Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 108.

Each of the one or more remote computing devices 106 can include one or more processors and one or more memory devices. The one or more memory devices can be used to store instructions that when executed by the one or more processors of the one or more remote computing devices 106 cause the one or more processors to perform operations and/or functions including operations and/or functions associated with the vehicle 108 including sending and/or receiving data or signals to and from the vehicle 108, monitoring the state of the vehicle 108, and/or controlling the vehicle 108. The one or more remote computing devices 106 can communicate (e.g., exchange data and/or signals) with one or more devices including the operations computing system 104 and the vehicle 108 via the communications network 102. For example, the one or more remote computing devices 106 can request the location of the vehicle 108 or a state of one or more objects detected by the one or more sensors 114 of the vehicle 108, via the communications network 102.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 108 including a location (e.g., a latitude and longitude), a velocity, an acceleration, a trajectory, a heading, and/or a path of the vehicle 108 based in part on signals or data exchanged with the vehicle 108. In some implementations, the operations computing system 104 can include the one or more remote computing devices 106.

In addition, or alternatively, the operations computing system 104 and/or the one or more remote computing devices 106 can include and/or otherwise be associated with the one or more training computing devices. By way of example, and as discussed in greater detail with reference to FIG. 3, the one or more training computing devices can be associated with a training computing system that is remote from the vehicle 108. For example, the training computing system can be a component of, or otherwise be associated with, the operations computing system 104 and/or the remote computing devices 106. The training computing system can include one or more processors and one or more memory devices. The one or more memory devices of the training computing system can store instructions that when executed by the one or more processors cause the one or more processors to perform operations and/or functions associated with the operation of one or more machine-learned models. For example, the operations can include training the one or more machine-learned models by receiving a rasterized image associated with a training object; generating a predicted trajectory of the training object by inputting the rasterized image into a machine-learned prediction generator model configured to output the predicted trajectory; converting the predicted trajectory into a rasterized trajectory that spatially corresponds to the rasterized image; determining a loss score for the predicted trajectory by inputting the rasterized trajectory and the rasterized image into a machine-learned discriminator model configured to output the loss score for the predicted trajectory; determining an overall loss for the machine-learned prediction generator model based, at least in part, on the loss score; and training the machine-learned prediction generator model by minimizing the overall loss for the machine-learned prediction generator model.

Figure 6:
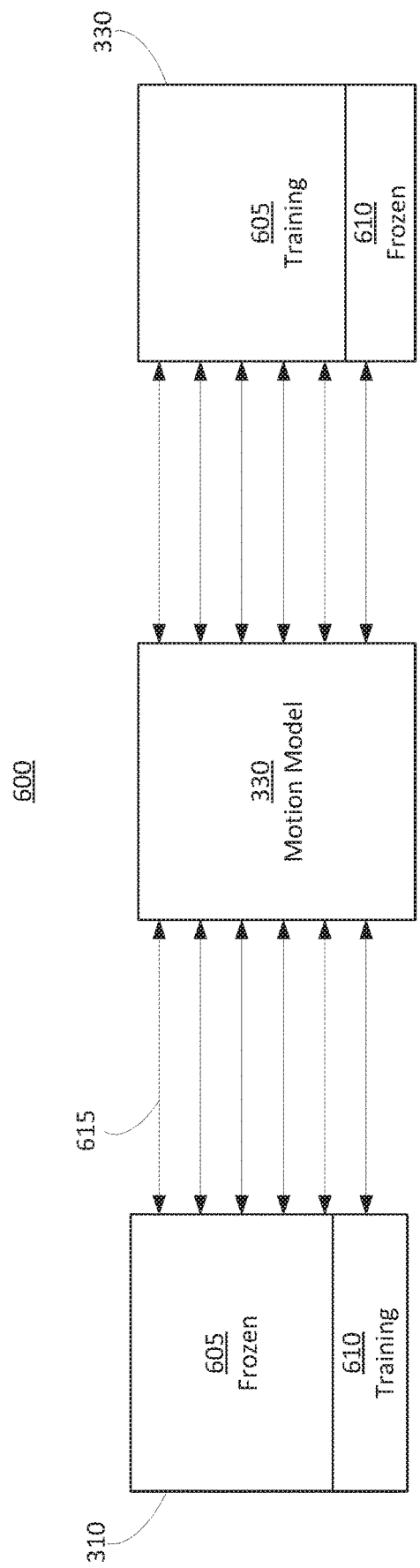
FIG. 6 depicts an example end-to-end training scenario according to example implementations of the present disclosure.

For instance, the training computing system can be configured to train one or more machine-learned models (e.g., the machine-learned models described with reference to FIGS. 3, 4, and 6). For example, the machine-learned prediction generator model can be trained in preparation for use by one or more systems onboard the vehicle 108 (e.g., prediction system 126, etc.) while online. The machine-learned prediction generator model can be trained in one or more devices remote from the vehicle 108 such as, for example, in one or more devices of the training computing system, the operations computing system 104, and/or one or more of the remote devices 106. For example, the training computing system can train the machine-learned prediction generator model using one or more training machine-learned networks. Once trained, the training computing system can discard the one or more training machine-learned networks (e.g., the machine-learned discriminator model) and communicate data indicative of the machine-learned prediction generator model to the vehicle 108.

In order to train the machine-learned prediction generator model, the training computing system can have access to a set of training data indicative of one or more previously observed objects. For example, as described in further detail with reference to FIG. 2, the training computing system, the operations computing system 104, and/or the one or more remote computing devices 106 can manage a training database including a set of training data indicative of a plurality of sensor observations of a plurality of training objects traversing a plurality of paths at a plurality of velocities, a plurality of accelerations, etc. For example, the training database can include state data associated with the state of one or more objects including one or more objects external to the vehicle 108. The state data can include a location of an object (e.g., a latitude and longitude of an object detected by the one or more sensors 114 of the vehicle 108), the state of a vehicle (e.g., the velocity, acceleration, and/or location of the vehicle 108), or the state of objects external to a vehicle (e.g., the physical dimensions, velocity, acceleration, heading, location, position, shape, and/or appearance of one or more objects external to the vehicle). The set of training data can be stored in one or more memory devices of the training computing system, the operations computing system 104, the one or more remote computing devices 106, etc.

In some implementations, the set of training data (e.g., state data of a plurality of previously observed objects) can be previously collected by a plurality of vehicles including vehicle 108. For example, the training computing system can be associated with a fleet of vehicles such as, for example, the fleet of vehicles of the service provider associated with the operations computing system 104. Each of the plurality of vehicles of the fleet of vehicles can include one or more sensors configured to obtain observations (e.g., state data) of a plurality of training objects. The plurality of vehicles can be configured to collect and store the plurality of observations. In addition, or alternatively, the plurality of vehicles can be configured to communicate the plurality of observations to one or more remote memory devices (e.g., memory device(s) of the training computing system, operations computing system 104, remote computing devices 106, etc.). In this manner, a fleet of vehicles can be utilized to generate a robust data set indicative of a plurality of real life object trajectories.

The vehicle 108 can be a ground-based vehicle (e.g., an automobile, a motorcycle, a train, a tram, a bus, a truck, a tracked vehicle, a light electric vehicle, a moped, a scooter, and/or an electric bicycle), an aircraft (e.g., airplane or helicopter), a boat, a submersible vehicle (e.g., a submarine), an amphibious vehicle, a hovercraft, a robotic device (e.g. a bipedal, wheeled, or quadrupedal robotic device), and/or any other type of vehicle. The vehicle 108 can be an autonomous vehicle that can perform various actions including driving, navigating, and/or operating, with minimal and/or no interaction from a human driver. The vehicle 108 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 108 can provide driving and navigational operation with minimal and/or no interaction from a human driver present in the vehicle. A semi-autonomous operational mode can be one in which the vehicle 108 can operate with some interaction from a human driver present in the vehicle. Park and/or sleep modes can be used between operational modes while the vehicle 108 performs various actions including waiting to provide a subsequent vehicle service, and/or recharging between operational modes.

An indication, record, and/or other data indicative of the state of the vehicle 108, the state of one or more passengers of the vehicle 108, and/or the state of an environment external to the vehicle 108 including one or more objects (e.g., the physical dimensions, velocity, acceleration, heading, location, and/or appearance of the one or more objects) can be stored locally in one or more memory devices of the vehicle 108. Furthermore, as discussed above, the vehicle 108 can provide data indicative of the state of the one or more objects (e.g., physical dimensions, velocity, acceleration, heading, location, and/or appearance of the one or more objects) within a predefined distance of the vehicle 108 to the operations computing system 104 and/or the remote computing devices 106, which can store an indication, record, and/or other data indicative of the state of the one or more objects within a predefined distance of the vehicle 108 in one or more memory devices associated with the operations computing system 104 and/or the one or more remote computing devices 106 (e.g., remote from the vehicle).

The vehicle 108 can include and/or be associated with the vehicle computing system 112. The vehicle computing system 112 can include one or more computing devices located onboard the vehicle 108. For example, the one or more computing devices of the vehicle computing system 112 can be located on and/or within the vehicle 108. The one or more computing devices of the vehicle computing system 112 can include various components for performing various operations and functions. For instance, the one or more computing devices of the vehicle computing system 112 can include one or more processors and one or more tangible non-transitory, computer readable media (e.g., memory devices). The one or more tangible non-transitory, computer readable media can store instructions that when executed by the one or more processors cause the vehicle 108 (e.g., its computing system, one or more processors, and other devices in the vehicle 108) to perform operations and/or functions, including those described herein for accessing state data including information associated with one or more respective locations and/or characteristics of one or more objects over a plurality of time intervals and/or determining, based at least in part on the state data and a machine-learned prediction generator model, one or more predicted trajectories of the one or more objects at one or more subsequent time intervals following the plurality of time intervals. Furthermore, the vehicle computing system 112 can perform one or more operations associated with the control, exchange of data, and/or operation of various devices and systems including robotic devices and/or other computing devices.

As depicted in FIG. 1, the vehicle computing system 112 can include the one or more sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more sensors 114 can be configured to generate and/or store data including the sensor data 116 associated with one or more objects that are proximate to the vehicle 108 (e.g., within range or a field of view of one or more of the one or more sensors 114). The one or more sensors 114 can include one or more Light Detection and Ranging (LiDAR) systems, one or more Radio Detection and Ranging (RADAR) systems, one or more cameras (e.g., visible spectrum cameras and/or infrared cameras), one or more sonar systems, one or more motion sensors, and/or other types of image capture devices and/or sensors. The sensor data 116 can include image data, radar data, LiDAR data, sonar data, and/or other data acquired by the one or more sensors 114. The one or more objects can include, for example, pedestrians, vehicles, bicycles, buildings, roads, foliage, utility structures, bodies of water, and/or other objects. The one or more objects can be located on or around (e.g., in the area surrounding the vehicle 108) various parts of the vehicle 108 including a front side, rear side, left side, right side, top, or bottom of the vehicle 108. The sensor data 116 can be indicative of locations associated with the one or more objects within the surrounding environment of the vehicle 108 at one or more times. For example, sensor data 116 can be indicative of one or more LiDAR point clouds associated with the one or more objects within the surrounding environment. The one or more sensors 114 can provide the sensor data 116 to the autonomy computing system 120.

In addition to the sensor data 116, the autonomy computing system 120 can retrieve or otherwise obtain data including the map data 122. The map data 122 can provide detailed information about the surrounding environment of the vehicle 108. For example, the map data 122 can provide information regarding: the identity and/or location of different roadways, road segments, buildings, or other items or objects (e.g., lampposts, crosswalks and/or curbs); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 108. The positioning system 118 can be any device or circuitry for analyzing the position of the vehicle 108. For example, the positioning system 118 can determine a position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 108 can be used by various systems of the vehicle computing system 112 and/or provided to one or more remote computing devices (e.g., the operations computing system 104 and/or the remote computing devices 106). For example, the map data 122 can provide the vehicle 108 relative positions of the surrounding environment of the vehicle 108. The vehicle 108 can identify its position within the surrounding environment (e.g., across six axes) based at least in part on the data described herein. For example, the vehicle 108 can process the sensor data 116 (e.g., LiDAR data, camera data) to match it to a map of the surrounding environment to get a determination of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 108 and determine a motion plan for controlling the motion of the vehicle 108 accordingly. For example, the autonomy computing system 120 can receive the sensor data 116 from the one or more sensors 114, attempt to determine the state of the surrounding environment by performing various processing techniques on the sensor data 116 (and/or other data), and generate an appropriate motion plan through the surrounding environment, including for example, a motion plan that navigates the vehicle 108 around the current and/or predicted locations of one or more objects detected by the one or more sensors 114. The autonomy computing system 120 can control the one or more vehicle control systems 138 to operate the vehicle 108 according to the motion plan.

The autonomy computing system 120 can identify one or more objects that are proximate to the vehicle 108 based at least in part on the sensor data 116 and/or the map data 122. For example, the perception system 124 can obtain state data 130 descriptive of a current and/or past state of an object that is proximate to the vehicle 108. The state data 130 for each object can describe, for example, an estimate of the object's current and/or past: location and/or position; speed; velocity; acceleration; heading; orientation; size/footprint (e.g., as represented by a bounding shape); class (e.g., pedestrian class vs. vehicle class vs. bicycle class), and/or other state information. The perception system 124 can provide the state data 130 to the prediction system 126 (e.g., for predicting the movement of an object).

The prediction system 126 can generate prediction data 132 associated with each of the respective one or more objects proximate to the vehicle 108. The prediction data 132 can be indicative of one or more predicted future locations of each respective object. The prediction data 132 can be indicative of a predicted path (e.g., predicted trajectory) of at least one object within the surrounding environment of the vehicle 108. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128. In some implementations, the perception and prediction systems 124, 126 (and/or other systems) can be combined into one system and share computing resources.

In some implementations, the prediction system 126 can utilize one or more machine-learned models. For example, the prediction system 126 can determine prediction data 132 including a predicted trajectory (e.g., a predicted path, one or more predicted future locations, etc.) along which a respective object is predicted to travel over time based on one or more machine-learned models. By way of example, the prediction system 126 can generate such predictions by including, employing, and/or otherwise leveraging a machine-learned prediction generator model. For example, the prediction system 126 can receive state data 130 (e.g., from the perception system 124) associated with one or more objects within the surrounding environment of the vehicle 108. The prediction system 126 can input the state data 130 (e.g., BEV image, LIDAR data, etc.) into the machine-learned prediction generator model to determine trajectories of the one or more objects based on the state data 130 associated with each object. For example, the machine-learned prediction generator model can be previously trained to output a future trajectory (e.g., a future path, one or more future geographic locations, etc.) of an object within a surrounding environment of the vehicle 108. In this manner, the prediction system 126 can determine the future trajectory of the object within the surrounding environment of the vehicle 108 based, at least in part, on the machine-learned prediction generator model.

As discussed above, the machine-learned prediction generator model can be previously trained via one or more machine-learning techniques. In some implementations, the machine-learned prediction generator model can be previously trained by one or more devices (e.g., training computing system, operations computing system 104, one or more remote computing devices 106, etc.) remote from the vehicle 108. For example, the machine-learned prediction generator model can include a generative network in a generative-adversarial network. For instance, the machine-learned prediction generator model can be trained, via backpropagation techniques, to minimize a loss generated by an adversarial network (e.g., a machine-learned discriminator model) of the generative-adversarial network. The adversarial network can be discarded after training and the machine-learned prediction generator model can be utilized by the prediction system to determine the one or more future trajectories.

The motion planning system 128 can determine a motion plan and generate motion plan data 134 for the vehicle 108 based at least in part on the prediction data 132 (and/or other data). The motion plan data 134 can include vehicle actions with respect to the objects proximate to the vehicle 108 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 108 can perform a certain action (e.g., pass an object) without increasing the potential risk to the vehicle 108 and/or violating any traffic laws (e.g., speed limits, lane boundaries, signage). The motion plan data 134 can include a planned trajectory, velocity, acceleration, and/or other actions of the vehicle 108.

The motion planning system 128 can provide the motion plan data 134 with data indicative of the vehicle actions, a planned trajectory, and/or other operating parameters to the vehicle control systems 138 to implement the motion plan data 134 for the vehicle 108. For instance, the vehicle 108 can include a mobility controller configured to translate the motion plan data 134 into instructions. By way of example, the mobility controller can translate a determined motion plan data 134 into instructions for controlling the vehicle 108 including adjusting the steering of the vehicle 108 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections). In some implementations, the communications system 136 can allow communication among one or more of the system on-board the vehicle 108. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop and/or smartphone) can be viewable by a user of the vehicle 108 that is located in the front of the vehicle 108 (e.g., driver's seat, front passenger seat). Additionally, or alternatively, a display device can be viewable by a user of the vehicle 108 that is located in the rear of the vehicle 108 (e.g., a back passenger seat). For example, the autonomy computing system 120 can provide one or more outputs including a graphical display of the location of the vehicle 108 on a map of a geographical area within one kilometer of the vehicle 108 including the locations of objects around the vehicle 108. A passenger of the vehicle 108 can interact with the one or more human-machine interfaces 140 by touching a touchscreen display device associated with the one or more human-machine interfaces to indicate, for example, a stopping location for the vehicle 108.

In some embodiments, the vehicle computing system 112 can perform one or more operations including activating, based at least in part on one or more signals or data (e.g., the sensor data 116, the map data 122, the state data 130, the prediction data 132, and/or the motion plan data 134) one or more vehicle systems associated with operation of the vehicle 108. For example, the vehicle computing system 112 can send one or more control signals to activate one or more vehicle systems that can be used to control and/or direct the travel path of the vehicle 108 through an environment.

By way of further example, the vehicle computing system 112 can activate one or more vehicle systems including: the communications system 136 that can send and/or receive signals and/or data with other vehicle systems, other vehicles, or remote computing devices (e.g., remote server devices); one or more lighting systems (e.g., one or more headlights, hazard lights, and/or vehicle compartment lights); one or more vehicle safety systems (e.g., one or more seatbelt and/or airbag systems); one or more notification systems that can generate one or more notifications for passengers of the vehicle 108 (e.g., auditory and/or visual messages about the state or predicted state of objects external to the vehicle 108); braking systems; propulsion systems that can be used to change the acceleration and/or velocity of the vehicle which can include one or more vehicle motor or engine systems (e.g., an engine and/or motor used by the vehicle 108 for locomotion); and/or steering systems that can change the path, course, and/or direction of travel of the vehicle 108.

Figure 2:
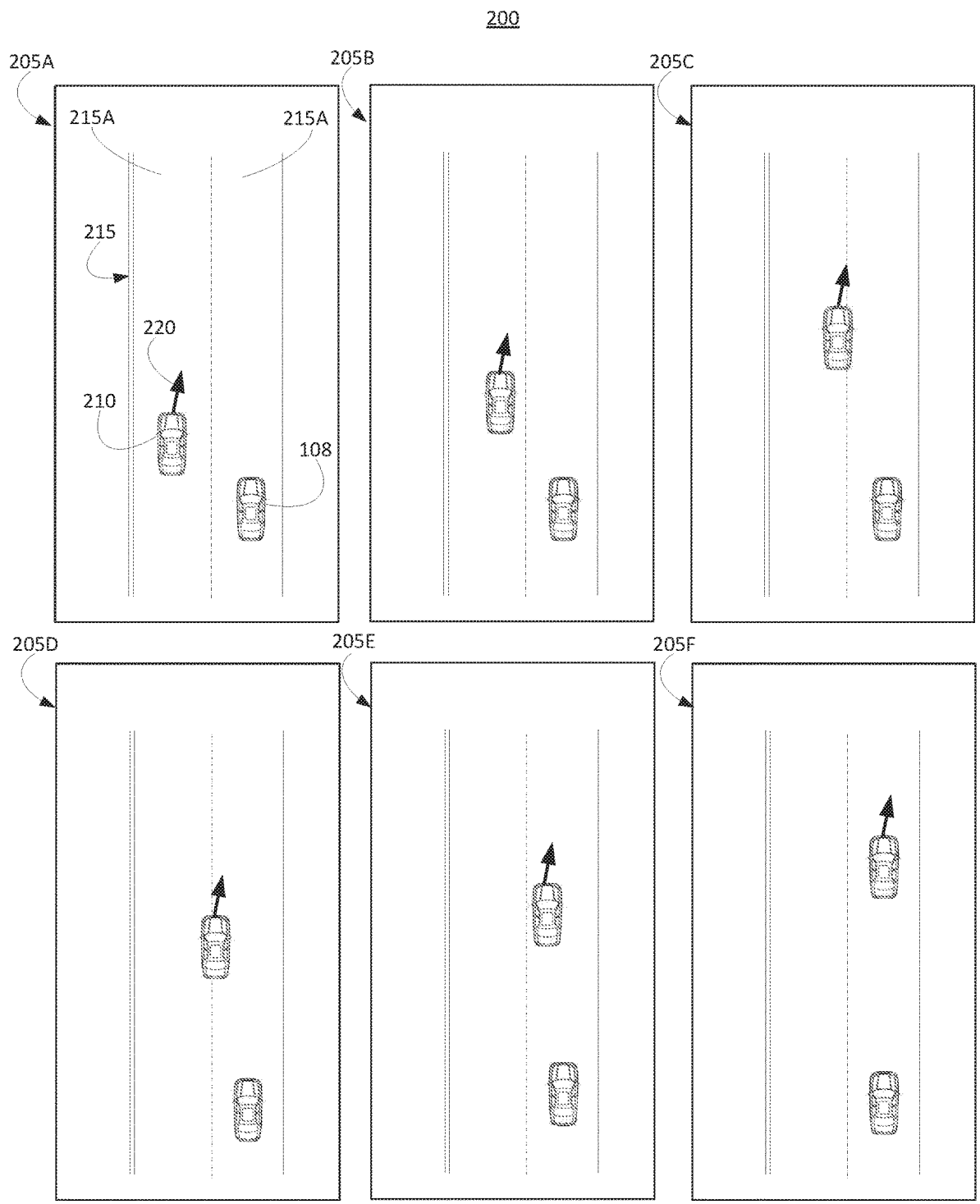
FIG. 2 depicts an example set of training images according to example implementations of the present disclosure.

FIG. 2 depicts an example set of training images according to example implementations of the present disclosure. As illustrated, the set of training images can include a plurality of images 205A-205F, each depicting the state (e.g., location relative to the vehicle 108, and/or environment (roadway 215, travel lanes 215A-B, etc.), a heading angle 220, etc.) of a training object 210 at one or more time steps. For example, the plurality of images 205A-F can include a plurality of RBG images. Each image in the set of images can include a previously captured image of the training object 210 at one or more subsequent time steps. For instance, image 205A can be captured at a first time step, image 205B can be captured at a second time step subsequent to the first time step, image 205C can be captured at a third time step subsequent to the second time step, image 205D can be captured at a fourth time step subsequent to the third time step, image 205E can be captured at a fifth time step subsequent to the fourth time step, image 205F can be captured at a sixth time step subsequent to the fifth time step, etc.

The set of training data can include state data indicative of the plurality of images 205A-F. For example, in some implementations, the set of training data can include one or more preprocessed rasterized images based on the plurality of images 205A-F. For example, a computing system can generate a rasterized image of an environment based on state data of the training object 210. For instance, the rasterized image can include a top-view image (e.g., BEV image) including one or more sensor observations of the training object 210 and the surrounding environment. By way of example, the one or more sensor observations can include multiple channels indicative of one of more features of the training object 210 (e.g., color, type, speed, heading angle 220 etc.) and/or features of the surrounding environment (e.g., temporal features such as time steps, spatial features (e.g., portion of the image, map data such as a particular roadway 215, travel lanes 215A-B, etc.), etc.). The rasterized image can be fused with the one or more features of the object and/or surrounding environment. Accordingly, the rasterized image can include an image (e.g., one or more of images 205A-F, an RGB image, a BEV image, etc.) encoded with the one or more sensor observations. In this manner, the rasterized image can include data indicative of one or more features of the training object 210 at one or more time steps.

In addition, or alternatively, the set of training data can include one or more ground truths indicative of previously observed object trajectories. For example, the set of training data can include observations of the training object 210 at one or more first and second points in time. For example, the one or more second points in time can be points in time occurring after the one or more first points in time. By way of example, images 205A-205C can be taken at the one or more first points in time (e.g., the first, second, and third time steps), whereas images 205D-205F can be taken at one or more second points in time (e.g., the fourth, fifth, and sixth time steps). As discussed in further detail with reference to FIG. 3, the rasterized image input into a machine-learned prediction generator model can be associated with one or more images (e.g., 205A-205C) corresponding to the one or more first points in time (first, second, and third time steps). The predicted trajectory can include a plurality of waypoints for the training object 210 at the one or more second points in time (e.g., fourth, fifth, and sixth time steps). In some implementations, the one or more observations of the set of training data at the one or more second points in time can be used as a ground truth for the predicted trajectory. In this manner, a machine-learned model can be trained to distinguish between a generated trajectory such as, for example, the predicted trajectory and a real trajectory (e.g., depicted by images 205D-205F) based on real life observations.

Figure 3:
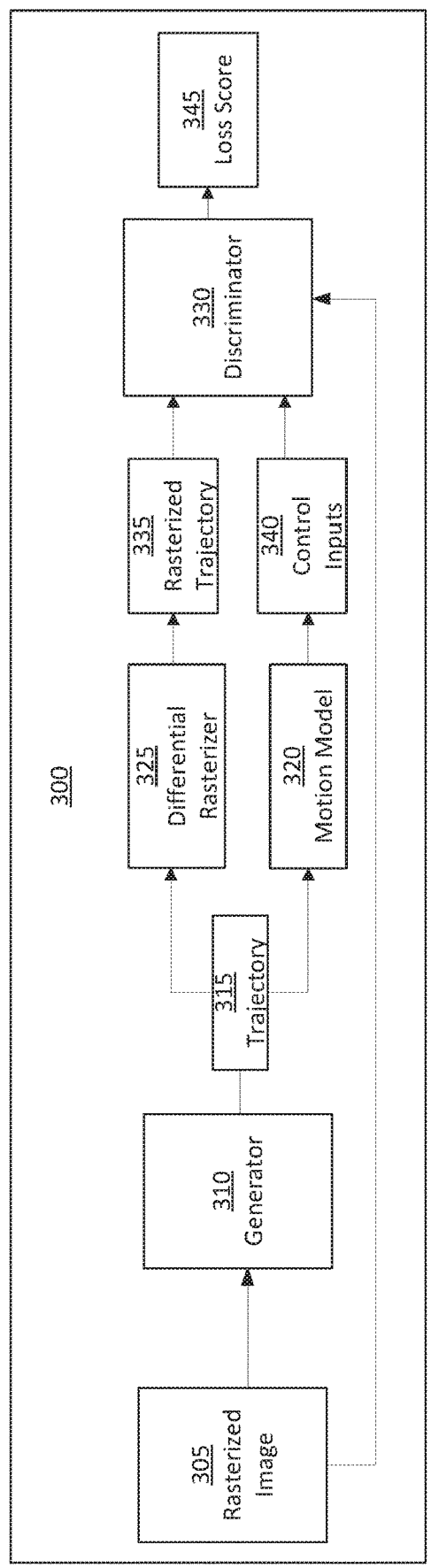
FIG. 3 depicts an example generative-adversarial network according to example implementations of the present disclosure.
Figure 4:
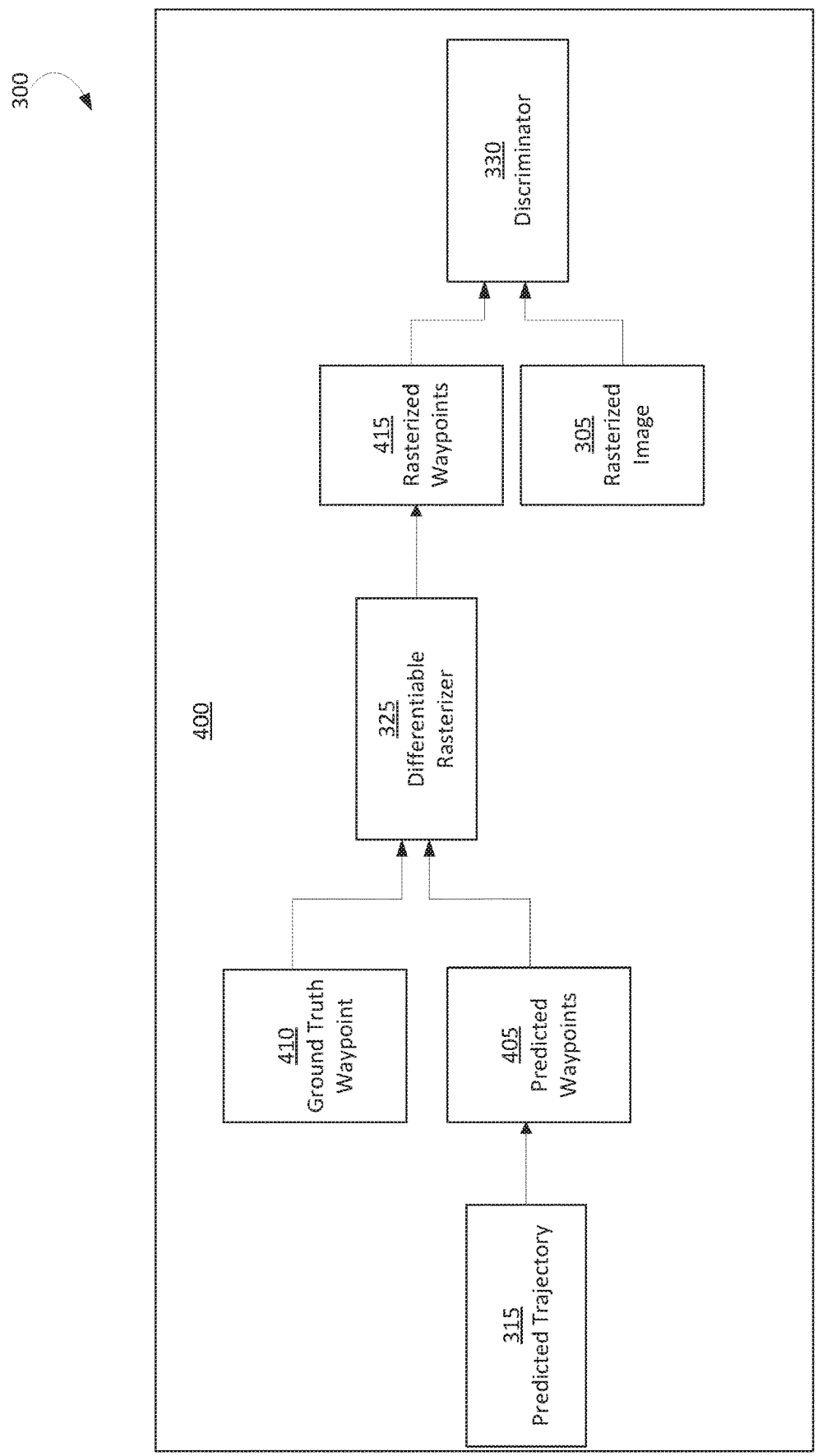
FIG. 4 depicts an example system overview of a differential rasterizer according to example implementations of the present disclosure.

FIG. 3 depicts an example generative-adversarial network of a training computing system 300 according to example implementations of the present disclosure. The training computing system 300 can utilize a generative-adversarial network including a machine-learned prediction generator model 310, a machine-learned motion model 320, a differential rasterizer 325, and a machine-learned discriminator model 330. The machine-learned prediction generator model 310 can be configured to take a rasterized image 305 as input and, in response, output the predicted trajectory 315. The machine-learned motion model 320 can be configured to take the predicted trajectory 315 as input and, in response, output one or more predicted control inputs 340. The differential rasterizer 325 can be configured to transform the predicted trajectory 315 into a rasterized trajectory 335 and the machine-learned discriminator model 330 can be configured to output a loss score 345 for the predicted trajectory 315 based on the rasterized trajectory 335 and the rasterized image 305. The machine-learned prediction generator model 310 can be trained based, at least in part, on the loss score 345.

More particularly, the training computing system 300 can receive the rasterized image 305 associated with a training object from a set of training data. In addition, or alternatively, the training computing system 300 can generate the rasterized image 305 based, at least in part, on the set of training data. By way of example, set of training data can include a plurality of images (e.g., RGB images, BEV images, etc.) and a plurality of sensor observations including multiple channels indicative of one or more features of the training object and/or the surrounding environment of the training object. The training computing system 300 can generate the rasterized image 305 from the set of training data based, at least in part, on the one or more image(s) and/or the sensor observations of the training object included in the set of training data.

The training computing system 300 can generate the predicted trajectory 315 of the training object based, at least in part, on the rasterized image 305. For example, the training computing system 300 can input the rasterized image 305 into the machine-learned prediction generator model 310. The machine-learned prediction generator model 310 can be configured to output the predicted trajectory 315 based, at least in part, on the rasterized image 305.

The machine-learned prediction generator model 310 can include one or more machine-learned models. For example, the machine-learned prediction generator model 310 can include at least one of a convolutional neural network, a recurrent neural network, a recursive neural network, a decision tree, logistic regression model, and/or a support vector machine. In some implementations, the machine-learned prediction generator model 310 can include a machine-learned generator network in a generative-adversarial network. For example, the machine-learned prediction generator model 310 can be trained to output a realistic predicted trajectory based on a loss function generated by another machine-learned model such as, for example, the machine-learned discriminator model 330. By way of example, the predicted trajectory 315 can include a plurality of future locations associated with the training object. For instance, the predicted trajectory 315 can include a plurality of waypoints, each of which can be indicative of a future location of the object. The machine-learned discriminator model 330 can be configured to determine a loss function based on how likely each future location of the predicted trajectory 315 is to occur.

In addition, or alternatively, the training computing system 300 can determine one or more predicted control inputs 340 for the training object. For example, the training computing system 300 can determine the one or more predicted control inputs 340 for the training object by inputting the rasterized image 305 and/or the predicted trajectory 315 for the training object into the machine-learned motion model 320. For instance, the machine-learned motion model 320 can be configured to output the one or more predicted control inputs 340 based, at least in part, on the data indicative of one or more features of the training object (e.g., as represented by the rasterized image 305) and/or the predicted trajectory 315. For example, the one or more control inputs 340 can include an input to a control device of the training object. By way of example, the one or more control inputs 340 can include a control input to a steering wheel of the training object that is used to determine the direction of travel of the training object. These predicted control inputs 340 can be used in conjunction with the predicted trajectory 315 to determine a more accurate representation of a future state of the training object.

The machine-learned motion model 320 can include at least one of a convolutional neural network, a recurrent neural network, a recursive neural network, a decision tree, logistic regression model, and/or a support vector machine. In some implementations, the machine-learned motion model 320 can include a machine-learned kinematics model. The kinematics model can be trained to generate control inputs (e.g., control inputs 340) associated with the motion of the training object, based at least in part, on the type of object. For example, the kinematics model can generate different control inputs for an object that is a vehicle than for an object that is a bicycle/motorcycle. In some implementations, the kinematics model can use the one or more physical constraints of the one or more training objects to determine the occurrence of events such as wheel slippage when a wheeled object loses traction with a road surface (e.g., traction loss due to a slippery road surface), thereby resulting in a more realistic and accurate prediction of the future location of an object in motion. The control inputs generated by the kinematics model can be used to refine the predicted trajectory 315 to more accurately reflect the motion of the type of object.

The training computing system 300 can convert the predicted trajectory 315 into a rasterized trajectory 335. For example, the training computing system 300 can apply a differential rasterizer 325 to the predicted trajectory 315 to transform the predicted trajectory 315 into a rasterized trajectory 335 that spatially corresponds to the rasterized image 305. For example, turning briefly to FIG. 4, FIG. 4 depicts an example system overview 400 of a differential rasterizer 325 according to example implementations of the present disclosure.

The training computing system 300 can convert the predicted trajectory 315 into a rasterized trajectory including one or more rasterized waypoints 415. For example, the predicted trajectory 315 can include a plurality of future locations of an object that do not spatially correspond to the rasterized image 305 and/or a map raster of the rasterized image 305. For instance, the rasterized image 305 can correspond to a particular three-dimensional area (e.g., represented by a map raster). By way of example, the rasterized image 305 can include a plurality of pixels. Each pixel can correspond to one or more pixel coordinates of a three-dimensional area such as, for example, a three-dimensional area represented by an image associated with the rasterized image 305. In addition, or alternatively, the predicted trajectory 315 can include a plurality of waypoints 405. Each of the plurality of waypoints can correspond to a different three-dimensional area. For example, the predicted trajectory 315 can include a plurality of waypoints 405 represented in a format, such that it is usable by a motion planning system of an autonomous vehicle. For example, in some implementations, a format preferable for use by the motion planning system can be different than a format preferable for use by the machine-learned models such as, for example, the format of the rasterized image 305 input into the machine-learned prediction generator model 310. For example, each of the plurality of waypoints 405 of the predicted trajectory 315 can correspond to one or more waypoint coordinates. In some implementations, the one or more waypoint coordinates can be indicative of a future location of the training object in the real world, whereas the one or more pixel coordinates can be indicative of one or more coordinates within a three-dimensional area of an image.

To increase the speed and efficiency of training machine-learned models, the training computing system 300 can apply the differential rasterizer 325 to the one or more waypoints 405 of the predicted trajectory 315 and/or one or more ground truth waypoints 410 to transform the predicted trajectory 315 (e.g., the one or more waypoints 405 of the predicted trajectory 315) and/or the one or more ground truth waypoints 410 into the same image space as the rasterized image 305. For example, the differential rasterizer 325 can be configured to output a plurality of rasterized waypoints 415 based, at least in part, on a predicted trajectory 315 and/or the one or more ground truth waypoints 410 input to the differential rasterizer 325. By way of example, the rasterized waypoints 415 can include a rasterized waypoint for each respective waypoint of the one or more waypoints 405 of the predicted trajectory 315. In addition, or alternatively, the rasterized waypoints 415 can include a rasterized waypoint for each respective ground truth waypoint of the one or more ground truth waypoints 410.

Figure 5:
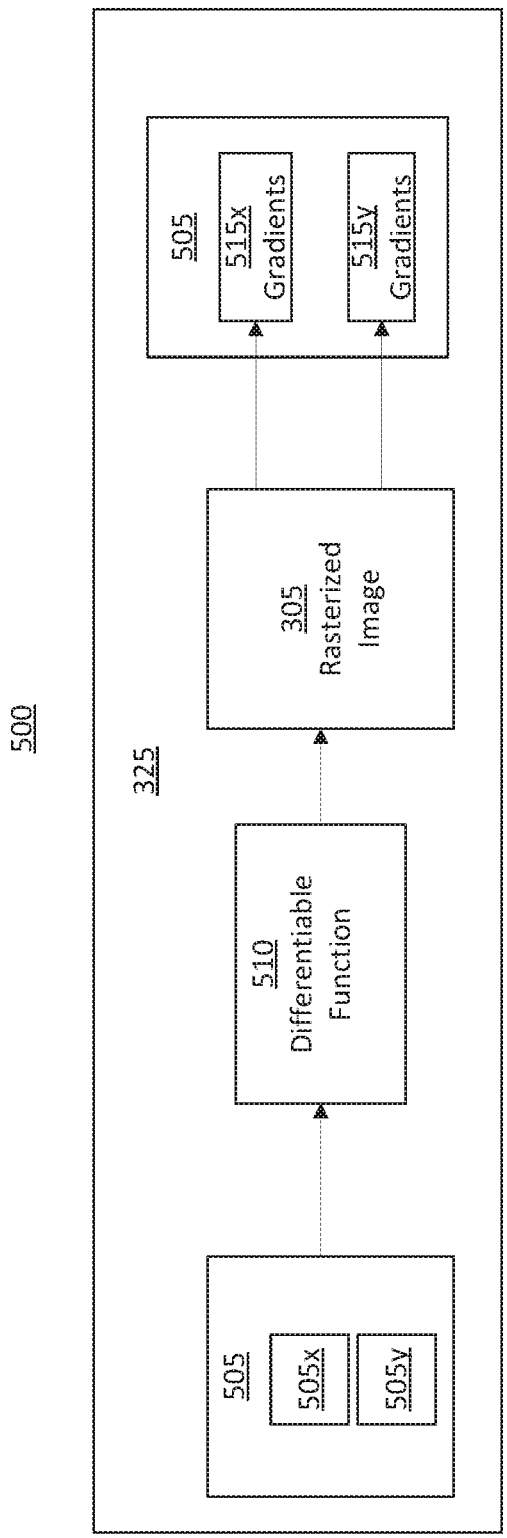
FIG. 5 depicts an example data flow of an example differential rasterizer according to example implementations of the present disclosure.

Turning to FIG. 5, FIG. 5 depicts an example data flow 500 of an example differential rasterizer 325 according to example implementations of the present disclosure. The differentiable rasterizer 325 can include a differentiable function 510 configured to map a waypoint coordinate 505 to a pixel coordinates (e.g., 505X, 505Y, etc.) of the rasterized image 305. For example, the differentiable function 510 can include a plurality of differentiable math operations (e.g., multiplication, addition, Gaussian, etc.). The differentiable function 510 can be configured to determine a gradient (e.g., 510X, 510Y, etc.) of the rasterized image 305 with respect to the pixel coordinates (e.g., 505X, 505Y) mapped to the waypoint coordinate 505. In this manner, the differentiable rasterized 325 can generate a rasterized trajectory including one or more waypoint coordinates (e.g., waypoint coordinates 505) mapped to the one or more images associated with the rasterized image 305. Each waypoint coordinate (e.g., waypoint coordinate 505) of the rasterized trajectory can include data indicative of one or more gradients (e.g., 515X, 515Y, etc.) corresponding to a pixel coordinate (505X, 505Y, etc.) associated with the rasterized image 305.

For example, the training computing system (e.g., via the differentiable rasterizer 325) can determine one or more coordinates (e.g., 505X, 505Y) of the three-dimensional area (e.g., of at least one image) corresponding to the rasterized image 305 for each respective waypoint 505 in the plurality of waypoints of the predicted trajectory. The training computing system can determine a pixel coordinate (e.g., 505X, 505Y, etc.) of the rasterized image 305 for each waypoint coordinate (e.g., waypoint coordinate 505) of the plurality of waypoints of the predicted trajectory. The determined one or more coordinates (e.g., 505X, 505Y, etc.) can be assigned to the respective waypoint 505. This can be repeated for each respective waypoint in the plurality of waypoints of the predicted trajectory until each respective waypoint 505 is associated with one or more coordinates (e.g., pixel coordinates 505X, 505Y) of the three-dimensional area (e.g., of at least one image) corresponding to the rasterized image 305. In this manner, the differentiable rasterizer 325 can generate a rasterized trajectory that spatially corresponds to the rasterized image 305.

In addition, the training computing system 300 (e.g., via the differentiable rasterizer 325) can determine one or more gradients (e.g., 515X, 515Y, etc.) for the rasterized image 305 with respect to the one or more coordinates (e.g., pixel coordinates 505X, 505Y) determined for each waypoint. For example, the one or more gradients (e.g., 515X, 515Y, etc.) can include data indicative of the rasterized image 305 with respect to a particular location denoted by a respective pixel coordinate. For example, if the rasterized image 305 includes a heat map with a spike at (x,y) and decaying temperatures further from (x,y). A gradient (e.g., 515X, 515Y) can be determined such that it is indicative of the slope of the heat map's surface.

Such information can provide useful contextual background during backpropagation. The contextual information, for example, can be indicative of a manner in which to change a respective pixel to reduce and/or increase a loss score. The gradients (e.g., 515X, 515Y) can be determined and input into the machine-learned discriminatory model (and/or the machine-learned prediction generator model). The machine-learned discriminatory model can determine a loss score based, at least in part, on the gradients (e.g., 515X, 515Y). The loss score can then flow back from the machine-learned discriminator model to the machine-learned prediction generator model (and/or vice versa) and the machine-learned prediction generator model (and/or the machine-learned discriminator model) can update its parameters based at least in part on the context provided by the one or more gradients (e.g., 515X, 515Y). For example, the context provided by the one or more gradients associated with a waypoint of a predicted trajectory can be associated with a parameter of the machine-learned prediction generator model (and/or the machine-learned discriminator model). The gradients, for instance, can be indicative of a manner in which to alter the parameter to increase and/or decrease a loss score. The machine-learned prediction generator model (and/or the machine-learned discriminator model) can receive the gradients and update the parameter based, at least in part, on the information identified by the one or more gradients associated with the waypoint.

For example, returning to FIG. 3, the rasterized trajectory 335 (e.g., including the one or more rasterized waypoints) and/or the rasterized image 305 can be input into the machine-learned discriminator model 330 configured to compare the rasterized waypoints of the rasterized trajectory 335 with the rasterized image 305 to determine a loss score 345. In this manner, the training computing system 300 can determine an overall loss for the machine-learned prediction generator model 310 based on the rasterized trajectory 335. To do so, the training computing system 300 can determine a loss score 345 for the predicted trajectory 315 by inputting one or more rasterized waypoints of the rasterized trajectory 335 and/or the rasterized image 305 into the machine-learned discriminator model 330. For example, the machine-learned discriminator model 330 can be configured to output the loss score 345 for the predicted trajectory 315. In addition, or alternatively, the loss score 345 for the predicted trajectory 315 can be based, at least in part, on the one or more predicted controls 340. For example, the training computing system 300 can input the rasterized trajectory 335, the rasterized image 305, and/or the one or more predicted controls 340 into the machine-learned discriminator model 330. In turn, the machine-learned discriminator model 330 can be configured to output the loss score for the predicted trajectory 315 and/or the one or more predicted controls 340 for the predicted trajectory 315.

The machine-learned discriminator model 330 can include one or more machine-learned models. For example, the machine-learned discriminator model 330 can include at least one of a convolutional neural network, a recurrent neural network, a recursive neural network, a decision tree, logistic regression model, and/or a support vector machine. In some implementations, the machine-learned discriminator model 330 can include a machine-learned adversarial network in a generative-adversarial network. For example, the machine-learned discriminator network can be trained to generate a loss function for a generative network such as the machine-learned prediction generator model 310. The loss function, for example, can be determined based on the generative network's ability to trick the adversarial network. For instance, a high loss function can be indicative of a weak generative network that is unable to trick the adversarial network, whereas a low loss function can be indicative of a strong generative network that is able to consistently trick the adversarial network.

In some implementations, the machine-learned discriminator model 330 can be pretrained. For example, the machine-learned discriminator model 330 can be previously trained to distinguish between one or more generated trajectories (e.g., fake trajectories such as predicted trajectory 315) output by the machine-learned prediction generator model 310 and one or more ground truths (e.g., real trajectories) associated with the one or more generated trajectories. For example, the machine-learned prediction generator model 310 can output a plurality of initial training trajectories. The plurality of initial training trajectories can be converted into a plurality of training rasterized trajectories. The plurality of training rasterized trajectories can be input into the machine-learned discriminator model 330 with a plurality of rasterized ground truths to learn the machine-learned discriminator model 330 to distinguish between a generated trajectory (e.g., such as predicted trajectory 315) and a real trajectory (e.g., a represented by one or more rasterized ground truths). In this manner, a strong machine-learned discriminator model 330 can be trained so that it can consistently differentiate between trajectories generated by the machine-learned prediction generator model 310 and ground truths based on real life observations. This can be done, for example, before the machine-learned prediction generator model 310 is trained based on the loss score 345 generated by the machine-learned discriminator model 330.

The training computing system 300 can determine an overall loss for the machine-learned prediction generator model 310 based, at least in part, on the loss score 345 output by the machine-learned discriminator model 330. For example, the loss score 345 can include a value indicative of the truthfulness (e.g., how real the input looks) of the predicted trajectory 315. By way of example, in some implementations, the loss score 345 can include a binary value. For instance, a loss score of one (e.g., "1") can be indicative of a real trajectory, whereas a loss score of zero (e.g., "0") can be indicative of a fake trajectory. In some implementations, the loss score 345 can include a percentage indicative of a probability that the predicted trajectory is real (and/or fake). For example, a higher percentage can be indicative of higher chance that the predicted trajectory is real (and/or fake) and/or vice versa.

The overall loss for the machine-learned prediction generator model 310 can be determined based on a plurality of loss scores determined for a plurality of predicted trajectories (e.g., predicted trajectory 315). For example, the training computing system 300 can generate a plurality of different rasterized trajectories (e.g., each associated with a different predicted trajectory) and input the plurality of rasterized trajectories into the machine-learned discriminator model 330. In response, the machine-learned discriminator model 330 can output a loss score for each trajectory. The overall loss can be determined based on an average loss score for the plurality of predicted trajectories. In this manner, the overall loss can be indicative of the probability that a predicted trajectory generated by the machine-learned prediction generator model 310 is an accurate representation of a real life occurrence.

The training computing system 300 can train the machine-learned prediction generator model 310 by minimizing the overall loss for the machine-learned prediction generator model 310. For example, the training computing system 300 can perform one or more machine-learning techniques (e.g., backpropagation) to learn the machine-learned prediction generator model based on the overall loss. For instance, the training computing system 300 can adjust the parameters of the machine-learned prediction generator model 310 based, at least in part, on the overall loss. Moreover, the parameters of the machine-learned prediction generator model 310 can be weighted in proportion to their contribution to decreasing the overall loss so that parameters that contribute more to reducing the loss are weighted more heavily. By way of example, the one or more parameters that do not change the overall loss (e.g., cause the loss to increase or decrease) may be kept the same (e.g., not adjusted), the one or more parameters that decrease the loss can be weighted more heavily (e.g., adjusted to increase their contribution to the loss), and the one or more parameters that increase the loss can have their weighting reduced (e.g., adjusted to reduce their contribution to the loss). In this manner, the adjustment of the one or more parameters of the machine-learned prediction generator model 310 over a plurality of iterations can result in a lower loss that can correspond to more accurately predicted trajectories.

In some implementations, the machine-learned prediction generator model 310 and the machine-learned discriminator model 330 can be trained end-to-end via backpropagation based on the overall loss. For instance, FIG. 6 depicts an example end-to-end training scenario 600 according to example implementations of the present disclosure. By way of example, the machine-learned discriminator model 330 can be trained to maximize the overall loss while the machine-learned prediction generator model 310 can be trained to minimize the overall loss. For example, the training computing system 300 can adjust one or more parameters of the machine-learned discriminator model 330 in order to increase the overall loss.

In some implementations, the machine-learned discriminator model 330 and the machine-learned prediction generator model 310 can be trained at different rates. For example, the machine-learned discriminator model 330 can be trained at a discriminator learning rate 605 and the machine-learned prediction generator model 310 can be trained at a prediction learning rate 610. The learning rate for each respective machine-learned model can be indicative of a relative degree with which the machine-learned model is trained during one or more cycles 615 of backpropagation. For example, a higher discriminator learning rate 605 can indicate that the machine-learned discriminator model 330 is configured to update its parameters during more cycles 615 of backpropagation than the machine-learned prediction generator model 310.

For example, in some implementations, the discriminator learning rate 605 can be a higher multiple of the prediction learning rate 610. In such a case, the machine-learned discriminator model 330 can be updated more times than the machine-learned prediction generator model 310 during one or more cycles 615 of backpropagation. This can be done, for example, to keep the machine-learned discriminator model 330 stronger than the machine-learned prediction generator model 310, thereby preventing the machine-learned prediction generator model 310 from learning to exploit loopholes in a weaker machine-learned discriminator model 330.

For example, in some implementations, the discriminator learning rate 605 can be more than two times the prediction learning rate 610. By way of example, the machine-learned prediction generator model 310 can be frozen (e.g., use the same parameters) during one or more cycle(s) 615 of backpropagation. While the machine-learned generator model 310 is frozen the machine-learned discriminator model 330 can be trained based on the predicted trajectories output by the frozen machine-learned prediction generator model 310. In this manner, the machine-learned discriminator model 330 can be trained to increase the overall loss function for the machine-learned prediction generator model 310 while the machine-learned prediction generator model 310 remains the same.

For example, in some implementations, the machine-learned prediction generator model 310 can be frozen for five of six cycles 615 of backpropagation. During each cycle 615 the machine-learned prediction generator model 310 can output a plurality of trajectories using the same parameters. The machine-learned discriminator model 330 can determine an overall loss for the plurality of trajectories and update its parameters to increase the overall loss throughout each cycle 615. After five cycles, the machine-learned discriminator model 330 can be frozen (e.g., use the same parameters) and the machine-learned prediction generator model 310 can be trained for one cycle 615, during which the machine-learned prediction generator model 310 can update its parameters to minimize the overall loss.

In addition, or alternatively, the discriminator learning rate 605 and/or the prediction learning rate 610 can be dynamically determined. For example, the training computing system 300 can determine the discriminator learning rate 605 based on a comparison between a threshold network loss (e.g., 50%, 70%, 90%, etc.) and the overall loss. For example, the training computing system 300 can freeze the machine-learned prediction generator model 310 until the machine-learned discriminator model 330 determines an overall loss above a threshold network loss. The threshold network loss, for example, can be a preset threshold loss above which the machine-learned prediction generator model 310 can be effectively trained. In this manner, the machine-learned prediction generator model 310 can generate predicted trajectories based on the same parameters until the machine-learned discriminator model 330 learns to identify the predicted trajectories as fake rather than real at an effective rate.

Figure 7:
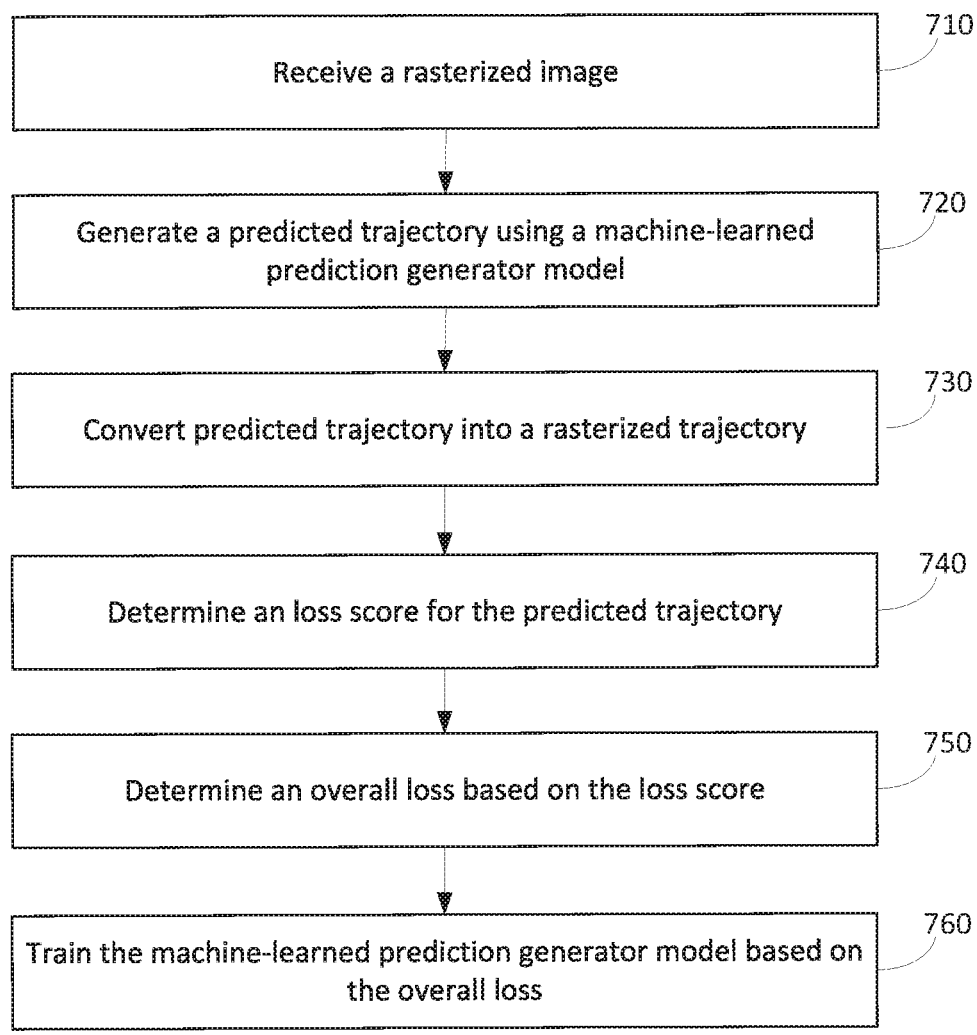
FIG. 7 depict a flowchart diagram of an example method of training a machine-learned model according to example implementations of the present disclosure.

FIG. 7 depicts a flowchart diagram of an example method of training a machine-learned model according to example implementations of the present disclosure. One or more portion(s) of the method 700 can be implemented by a computing system that includes one or more computing devices such as, for example, the computing systems described with reference to the other figures (e.g., the vehicle computing system 112, the training computing system, the operations computing system 104, the one or more remote computing devices 106, etc.). Each respective portion of the method 700 can be performed by any (or any combination) of one or more computing devices. Moreover, one or more portion(s) of the method 700 can be implemented as an algorithm on the hardware components of the device(s) described herein (e.g., as in FIGS. 1, 9-10, etc.), for example, to train one or more machine-learned models to output a predicted trajectory. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 7 is described with reference to elements/terms described with respect to other systems and figures for exemplary illustrated purposes and is not meant to be limiting. One or more portions of method 700 can be performed additionally, or alternatively, by other systems.

At 710, the method 700 can include receiving a rasterized image. For example, a computing system (e.g., training computing system, operations computing system 104, one or more remote computing devices 106, etc.) can receive a rasterized image. For instance, the rasterized image can be associated with a training object. Additionally, in some implementations, the rasterized image can include data indicative of one or more features of the training object. The rasterized image can be received from a set of training data indicative of one or more previously observed objects.

At 720, the method 700 can include generating a predicted trajectory using a machine-learned prediction generator model. For example, a computing system (e.g., training computing system, operations computing system 104, one or more remote computing devices 106, etc.) can generate a predicted trajectory. By way of example, the predicted trajectory of the training object can be generated by the computing system by inputting the rasterized image into a machine-learned prediction generator model configured to output the predicted trajectory. For instance, the computing system can include a machine-learned prediction generator model configured to receive a rasterized image associated with a training object, and in response to receipt of the rasterized image, output a predicted trajectory of the training object.

In some implementations, the computing system can determine one or more predicted control inputs for the training object by inputting the rasterized image and the predicted trajectory into a machine-learned motion model. For instance, the machine-learned motion model configured to output one or more predicted control inputs based, at least in part, on the data indicative of the one or more features of the training object and the predicted trajectory. The one or more predicted control inputs can include at least one of a longitudinal acceleration, steering angle, and/or some other control input such as, for example, jerk, steering change, etc. of the training object.

At 730, the method 700 can include converting the predicted trajectory into a rasterized trajectory. For example, a computing system (e.g., training computing system, operations computing system 104, one or more remote computing devices 106, etc.) can convert the predicted trajectory into a rasterized trajectory. The rasterized trajectory can spatially correspond to the rasterized image. For example, as discussed in greater detail with regards to FIG. 8, the computing system can apply a differentiable rasterizer to the predicted trajectory to transform the predicted trajectory into a same image space as the rasterized image. For instance, the computing system can include a differential rasterizer configured to receive a predicted trajectory, and in response to receipt of the predicted trajectory, convert the predicted trajectory into a rasterized trajectory.

At 740, the method 700 can include determining a loss score for the predicted trajectory. For example, a computing system (e.g., training computing system, operations computing system 104, one or more remote computing devices 106, etc.) can determine the loss score for the predicted trajectory. By way of example, the loss score for the predicted trajectory can be determined by the computing system by inputting the rasterized trajectory and the rasterized image into a machine-learned discriminator model configured to output the loss score for the predicted trajectory. For instance, the computing system can include a machine-learned discriminator model configured to receive the rasterized trajectory and the rasterized image, and in response to receipt of the rasterized trajectory and rasterized image, output a loss score for the predicted trajectory. In addition, or alternatively, the loss score for the predicted trajectory can be based, at least in part, on the one or more predicted control inputs. For example, the one or more predicted control inputs can be input into the machine-learned discriminator model, and the machine-learned discriminator model can output a loss score based, at least in part, on the one or more predicted control inputs.

The machine-learned discriminator model can be previously trained. For example, the set of training data can include one or more ground truths indicative of a previously observed object trajectory. The machine-learned discriminator model can be previously trained to distinguish between generated trajectories (e.g., generated by the machine-learned prediction generator model) and the one or more ground truths.

At 750, the method 700 can include determining an overall loss for the machine-learned prediction generator model. For example, a computing system (e.g., training computing system, operations computing system 104, one or more remote computing devices 106, etc.) can determine the overall loss for the machine-learned prediction generator model. For instance, the computing system can determine the overall loss for the machine-learned prediction generator model based, at least in part, on the loss score.

At 760, the method 700 can include training the machine-learned prediction generator model based on the overall loss. For example, a computing system (e.g., training computing system, operations computing system 104, one or more remote computing devices 106, etc.) can train the machine-learned prediction generator model based on the overall loss. For instance, the computing system can train the machine-learned prediction generator model by minimizing the overall loss for the machine-learned prediction generator model.

In some implementations, the machine-learned prediction generator model and the machine-learned discriminator model can be trained end-to-end via backpropagation based on the overall loss. For example, the machine-learned discriminator model can be trained at a discriminator learning rate and the machine-learned prediction generator model can be trained at a prediction learning rate. The discriminator learning rate can be a higher multiple of the prediction learning rate. For instance, the discriminator learning rate can be five times the prediction learning rate. In some implementations, the computing system can determine the discriminator learning rate based on a comparison between a threshold network loss and the overall loss. For example, the threshold network loss can be a predetermined loss. The machine-learned discriminator model can be trained until an overall loss is determined at or above the threshold network loss. In this manner, the machine-learned discriminator model can be continuously updated to generate loss scores used to determine a predetermined overall loss (e.g., a loss that is determined to be most efficient for training purposes).

Figure 8:
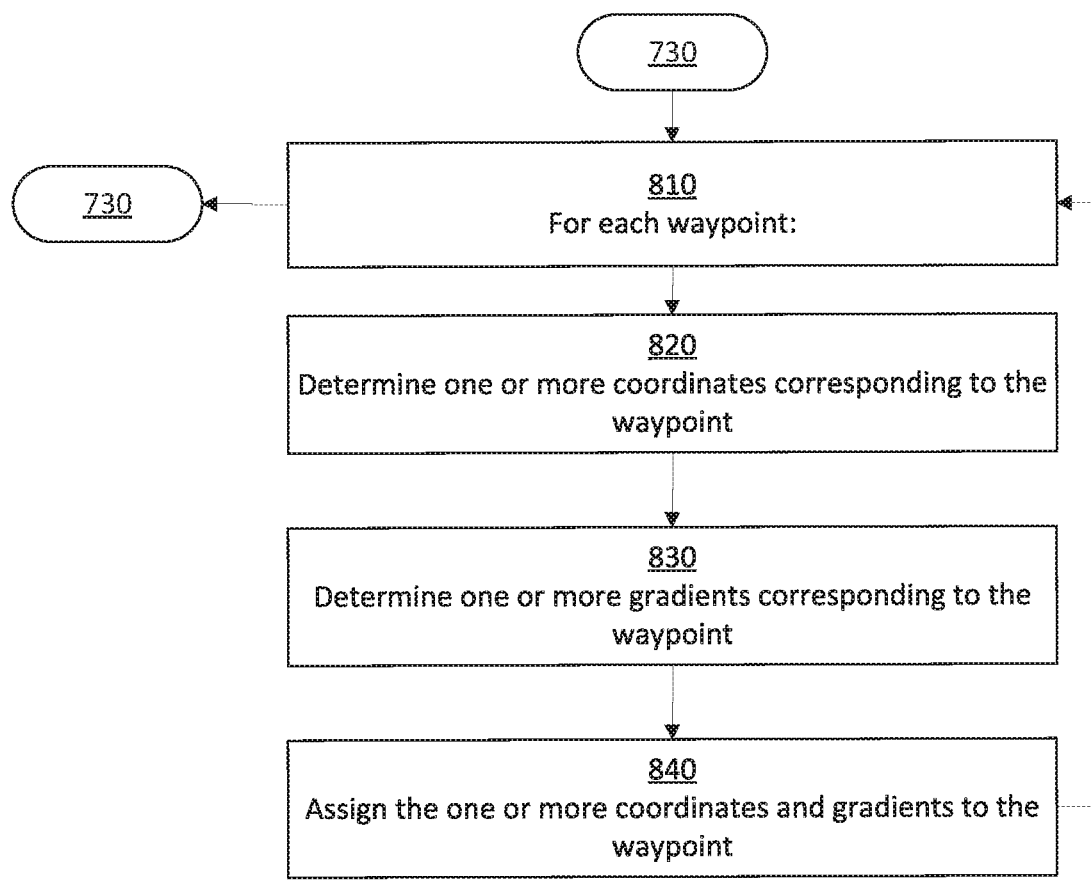
FIG. 8 depicts a flowchart diagram of an example method of converting a predicted trajectory to a rasterized trajectory according to example implementations of the present disclosure.

FIG. 8 depicts a flowchart diagram of an example method of converting a predicted trajectory to a rasterized trajectory according to example implementations of the present disclosure. One or more portion(s) of the method 800 can be implemented by a computing system that includes one or more computing devices such as, for example, the computing systems described with reference to the other figures (e.g., the vehicle computing system 112, the training computing system, the operations computing system 104, the one or more remote computing devices 106, etc.). Each respective portion of the method 800 can be performed by any (or any combination) of one or more computing devices. Moreover, one or more portion(s) of the method 800 can be implemented as an algorithm on the hardware components of the device(s) described herein (e.g., as in FIGS. 1, 9-10, etc.), for example, to train one or more machine-learned model to output a predicted trajectory. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 8 is described with reference to elements/terms described with respect to other systems and figures for exemplary illustrated purposes and is not meant to be limiting. One or more portions of method 800 can be performed additionally, or alternatively, by other systems.

At (810), the method 800 can include analyzing a respective waypoint in a plurality of waypoints of a predicted trajectory. For example, a computing system (e.g., training computing system, operations computing system 104, one or more remote computing devices 106, etc.) can analyze the respective waypoint in the plurality of waypoints for the predicted trajectory. For instance, the predicted trajectory can include a plurality of waypoints. Each waypoint can be indicative of a future location of the training object (e.g., for which the predicted trajectory is based). In addition, or alternatively, the rasterized image can include a plurality of pixels. Each pixel of the plurality of pixels can correspond to one or more coordinates of a three-dimensional area.

At (820), the method 800 can include determining one or more coordinates corresponding to the respective waypoint. For example, a computing system (e.g., training computing system, operations computing system 104, one or more remote computing devices 106, etc.) can determine one or more coordinates corresponding to the respective waypoint. By way of example, the computing system can determine one or more coordinates of the three-dimensional area (e.g., for which the plurality of pixels correspond) that correspond to the respective waypoint.

At (830), the method 800 can include determining one or more gradients corresponding to the respective waypoint. For example, a computing system (e.g., training computing system, operations computing system 104, one or more remote computing devices 106, etc.) can determine the one or more gradients corresponding to the respective waypoint.

At (840), the method 800 can include assigning the one or more coordinates and the one or more gradients to the respective waypoint. For example, a computing system (e.g., training computing system, operations computing system 104, one or more remote computing devices 106, etc.) can assign the one or more coordinates and the one or more gradients to the respective waypoint.

The method 800 can then return to step (810) for each waypoint in the plurality of waypoints of the predicted trajectory.

Figure 9:
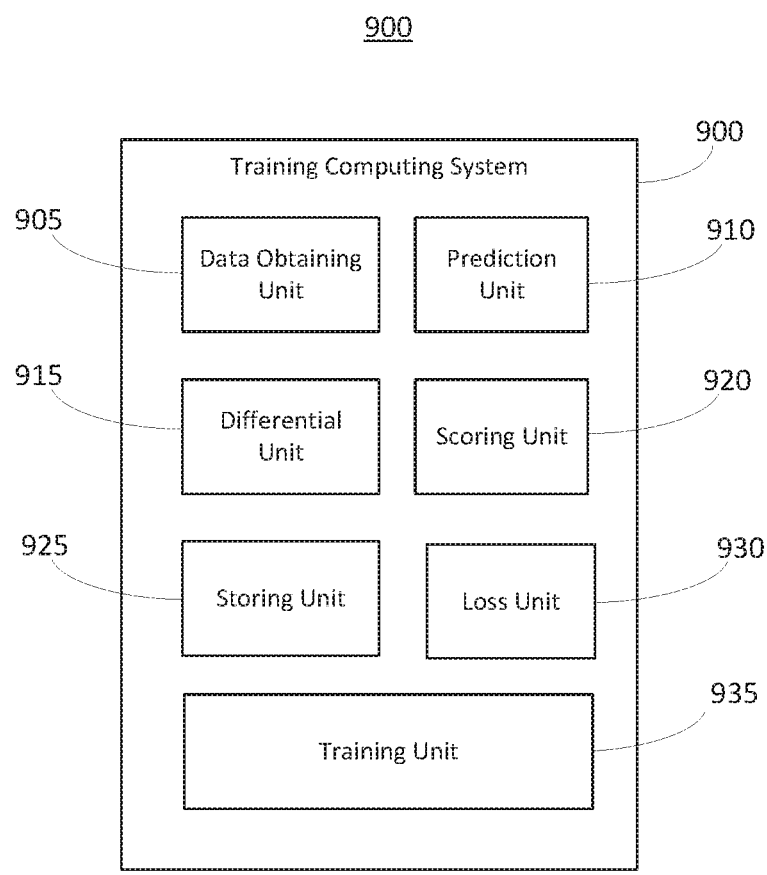
FIG. 9 depicts example system with various means for performing operations and functions according example implementations of the present disclosure.

FIG. 9 depicts an example of a training computing system 900 according to example implementations of the present disclosure. One or more operations and/or functions in FIG. 9 can be implemented and/or performed by one or more devices (e.g., one or more computing devices of the training computing system) or systems including, for example, the operations computing system 104, the vehicle 108, or the vehicle computing system 112, which are shown in FIG. 1. Further, the one or more devices and/or systems in FIG. 9 can include one or more features of one or more devices and/or systems including, for example, the operations computing system 104, the vehicle 108, or the vehicle computing system 112, which are depicted in FIG. 1.

Various means can be configured to perform the methods and processes described herein. For example, a computing system can include data obtaining unit(s) 905, prediction unit(s) 910, differential unit(s) 915, scoring unit(s) 920, storing unit(s) 925, loss unit(s) 930, training unit(s) 935, and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., data obtaining unit(s) 905, etc.) can be configured to obtain data, for example, such as a rasterized image associated with a training object.

The means (e.g., prediction unit(s) 910, etc.) can be configured to generate a predicted trajectory of the training object. For example, the means (e.g., prediction unit(s) 910, etc.) can include and/or otherwise have access to a machine-learned prediction generator model configured to output the predicted trajectory. In addition, or alternatively, the means (e.g., prediction unit(s) 910, etc.) can include and/or otherwise have access to a machine-learned motion model configured to output one or more predicted control inputs based, at least in part, on data indicative of one or more features of a training object and/or a predicted trajectory for the training object.

The means (e.g., differential unit(s) 915, etc.) can be configured to determine a rasterized trajectory based on the predicted trajectory. For example, the means (e.g., differential unit(s) 915, etc.) can include and/or otherwise have access to a differential rasterized configured to convert the predicted trajectory into a rasterized trajectory. For instance, the rasterized trajectory can spatially correspond to the rasterized image. By way of example, the predicted trajectory can include a plurality of waypoints. Each waypoint can be indicative of a future location of the object. Converting the predicted trajectory into a rasterized trajectory can include, for example, applying a differentiable rasterizer to the predicted trajectory to transform the predicted trajectory into a same image space as the rasterized image. For instance, the rasterized image can include a plurality of pixels and each pixel of the plurality of pixels can correspond to one or more coordinates of a three-dimensional area. In some implementations, the means (e.g., differential unit(s) 915, etc.) can be configured to, for each respective waypoint in the plurality of waypoints of the predicted trajectory, determine one or more coordinates of the three-dimensional area that correspond to the respective waypoint and assign the one or more coordinates to the respective waypoint.

The means (e.g., scoring unit(s) 920, etc.) can be configured to determine a loss score for the predicted trajectory. For example, the means (e.g., scoring unit(s) 920, etc.) can include and/or otherwise have access to a machine-learned discriminator model configured to output the loss score for the predicted trajectory. For instance, means (e.g., scoring unit(s) 920, etc.) can determine a loss score for the predicted trajectory by inputting the rasterized trajectory and the rasterized image into a machine-learned discriminator model configured to output the loss score for the predicted trajectory.

The means (e.g., storing unit(s) 925, etc.) can be configured to store data. For example, the means (e.g., storing unit(s) 925, etc.) can be configured to store the loss score for the predicted trajectory. In addition, or alternatively, the means (e.g., storing unit(s) 925, etc.) can be configured to store image data in a set of training data. For example, the set of training data can be indicative of one or more previously observed objects. In addition, or alternatively, the set of training data can include one or more ground truths indicative of a previously observed object trajectory, The means (e.g., loss unit(s) 930, etc.) can be configured to determine an overall loss for the machine-learned prediction generator model. For example, the means (e.g., loss unit(s) 930, etc.) can be configured to determine the overall loss based, at least in part, on the loss score.

The means (e.g., the training unit(s) 935, etc.) can be configured to train the machine-learned prediction generator model. For example, the means (e.g., training unit(s) 935, etc.) can be configured to train the machine-learned prediction generator model by minimizing the overall loss for the machine-learned prediction generator model. In some implementations, the means (e.g., training unit(s) 935, etc.) can be configured to train the machine-learned prediction generator model and the machine-learned discriminator model end-to-end via backpropagation based on the overall loss. By way of example, the machine-learned discriminator model can be trained at a discriminator learning rate and the machine-learned prediction generator model can be trained at a prediction learning rate. In some implementations, the discriminator learning rate can be a higher multiple of the prediction learning rate. For example, the means (training unit(s) 935, etc.) can be configured to determine the discriminator learning rate based on a comparison between a threshold network loss and the overall loss. In addition, or alternatively, the means (training unit(s) 935, etc.) can be configured to set the discriminator learning rate as five times the prediction learning rate. In addition, the mean(s) (e.g., training unit(s) 935, etc.) can be further configured to train the machine-learned discriminator model to distinguish between generated trajectories and one or more ground truths.

Figure 10:
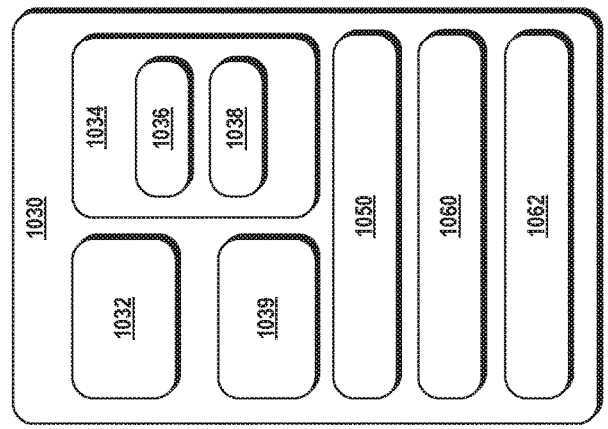
FIG. 10 depicts example system components according to example embodiments of the present disclosure.
Figure 10:
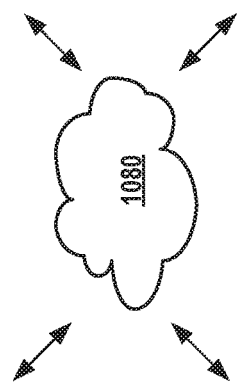
Figure 10:
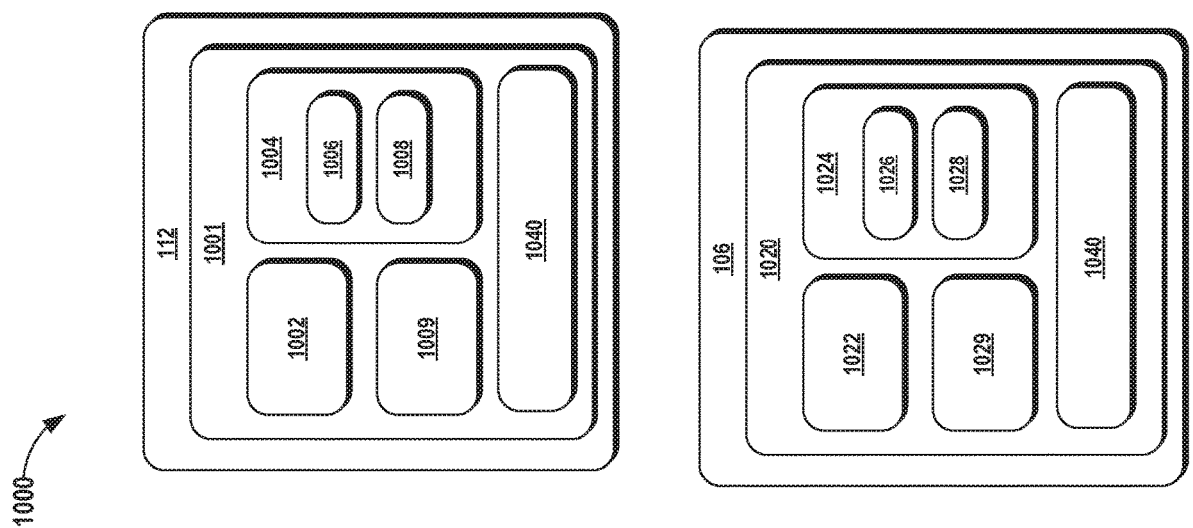

FIG. 10 depicts example system components of an example system 1000 according to example embodiments of the present disclosure. The example system 1000 can include the vehicle computing system 112, the operations computing system 106, the training computing system 300, etc. that are communicatively coupled over one or more network(s) 1080.

The vehicle computing system 112 can include one or more computing device(s) 1001. The computing device(s) 1001 of the vehicle computing system 112 can include processor(s) 1002 and a memory 1004 (e.g., onboard the vehicle 104). The one or more processors 1002 can be any suitable processing device (e.g., a processor core, a microprocessor, an ASIC, a FPGA, a controller, a microcontroller, etc.) and can be one processor or a plurality of processors that are operatively connected. The memory 1004 can include one or more non-transitory computer-readable storage media, such as RAM, ROM, EEPROM, EPROM, one or more memory devices, flash memory devices, etc., and combinations thereof.

The memory 1004 can store information that can be accessed by the one or more processors 1002. For instance, the memory 1004 (e.g., one or more non-transitory computer-readable storage mediums, memory devices) can include computer-readable instructions 1006 that can be executed by the one or more processors 1002. The instructions 1006 can be software written in any suitable programming language or can be implemented in hardware. Additionally, or alternatively, the instructions 1006 can be executed in logically and/or virtually separate threads on processor(s) 1002.

For example, the memory 1004 can store instructions 1006 that when executed by the one or more processors 1002 cause the one or more processors 1002 (e.g., of the computing system 112) to perform operations such as any of the operations and functions of the vehicle computing system 112, the vehicle 108, or for which the vehicle computing system 112 and/or the vehicle 108 are configured, as described herein, the operations for training one or more machine-learned models, receiving/storing state data for one or more object, predicting object trajectories and/or controlling an autonomous vehicle (e.g., one or more portions of method 600/700), and/or any other functions for the vehicle computing system 112, as described herein.

The memory 1004 can store data 1008 that can be obtained, received, accessed, written, manipulated, created, and/or stored. The data 1008 can include, for instance, sensor data, state data, predicted data, data associated with a geographic area, input data, data indicative of machine-learned model(s), data indicative of model outputs, motion planning data, training data and/or other data/information described herein. In some implementations, the computing device(s) 1001 can obtain from and/or store data in one or more memory device(s) that are remote from the vehicle 108 such as one or more memory device of the training computing system.

The computing device(s) 1001 can also include a communication interface 1009 used to communicate with one or more other system(s) on-board the vehicle 108 and/or a remote computing device that is remote from the vehicle 108 (e.g., the other systems of FIG. 1, etc.). The communication interface 1009 can include any circuits, components, software, etc. for communicating via one or more networks (e.g., 1080). In some implementations, the communication interface 1009 can include for example, one or more of a communications controller, receiver, transceiver, transmitter, port, conductors, software and/or hardware for communicating data/information.

The operations computing system 106 can perform the operations and functions for managing vehicles (e.g., a fleet of autonomous vehicles). The operations computing system 106 can be located remotely from the vehicle. For example, the operations computing system 106 can operate offline, off-board, etc. The operations computing system 106 can include one or more distinct physical computing devices.

The operations computing system 106 can include one or more computing devices 1020. The one or more computing devices 1020 can include one or more processors 1022 and a memory 1024. The one or more processors 1022 can be any suitable processing device (e.g., a processor core, a microprocessor, an ASIC, a FPGA, a controller, a microcontroller, etc.) and can be one processor or a plurality of processors that are operatively connected. The memory 1024 can include one or more non-transitory computer-readable storage media, such as RAM, ROM, EEPROM, EPROM, one or more memory devices, flash memory devices, etc., and combinations thereof.

The memory 1024 can store information that can be accessed by the one or more processors 1022. For instance, the memory 1024 (e.g., one or more non-transitory computer-readable storage mediums, memory devices) can store data 1026 that can be obtained, received, accessed, written, manipulated, created, and/or stored. The data 1026 can include, for instance, training data such as one or more observations of one or more training objects, data indicative of one or more machine-learned model(s), map data, data associated with a geographic area, and/or other data or information described herein. In some implementations, the operations computing system 106 can obtain data from one or more memory device(s) that are remote from the operations computing system 106.

The memory 1024 can also store computer-readable instructions 1028 that can be executed by the one or more processors 1022. The instructions 1028 can be software written in any suitable programming language or can be implemented in hardware. Additionally, or alternatively, the instructions 1028 can be executed in logically and/or virtually separate threads on processor(s) 1022. For example, the memory 1024 can store instructions 1028 that when executed by the one or more processors 1022 cause the one or more processors 1022 to perform any of the operations and/or functions described herein, including, for example, any of the operations and functions of the operations computing system 106, as well as one or more portions of methods 700, 800, and/or other operations and functions.

The computing device(s) 1020 can also include a communication interface 1029 used to communicate with one or more other system(s). The communication interface 1029 can include any circuits, components, software, etc. for communicating via one or more networks (e.g., 1080). In some implementations, the communication interface 1029 can include for example, one or more of a communications controller, receiver, transceiver, transmitter, port, conductors, software and/or hardware for communicating data/information.

According to an aspect of the present disclosure, the vehicle computing system 112 and/or the operations computing system 106 can store or include one or more machine-learned models 1040. As examples, the machine-learned models 1040 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), or other forms of neural networks. The machine-learned models 1040 can include the machine-learned prediction generator model 310, the machine-learned motion model 320, and/or the machine-learned discriminator model, as described herein.

In some implementations, the vehicle computing system 112 and/or the operations computing system 106 can receive one or more of the machine-learned models 1040 from the training computing system 1030 over the network(s) 1080 and can store the one or more machine-learned models 1040 in the memory of the respective system. The vehicle computing system 112 and/or the operations computing system 106 can use or otherwise implement the one or more machine-learned models 1040 (e.g., by processor(s) 1002, 1022). By way of example, the vehicle computing system 112 can implement the machine-learned prediction generator model 310 and/or the machine-learned motion model 320 to generate one or more object trajectories. In addition, or alternatively, the operations computing system can implement the machine-learned prediction generator model 310 and/or the machine-learned discriminator model 330 to train the machine-learned prediction generator model 310 for deployment on the vehicle computing system.

The training computing system 1030 can include one or more processors 1032 and a memory 1034. The one or more processors 1032 can be any suitable processing device (e.g., a processor core, a microprocessor, an ASIC, a FPGA, a controller, a microcontroller, etc.) and can be one processor or a plurality of processors that are operatively connected. The memory 1034 can include one or more non-transitory computer-readable storage media, such as RAM, ROM, EEPROM, EPROM, one or more memory devices, flash memory devices, etc., and combinations thereof.

The memory 1034 can store information that can be accessed by the one or more processors 1032. For instance, the memory 1034 (e.g., one or more non-transitory computer-readable storage mediums, memory devices) can store data 1036 that can be obtained, received, accessed, written, manipulated, created, and/or stored. In some implementations, the training computing system 1030 can obtain data from one or more memory devices that are remote from the system 1030.

The memory 1034 can also store computer-readable instructions 1038 that can be executed by the one or more processors 1032. The instructions 1038 can be software written in any suitable programming language or can be implemented in hardware. Additionally, or alternatively, the instructions 1038 can be executed in logically and/or virtually separate threads on processor(s) 1032. The memory 1034 can store the instructions 1038 that when executed by the one or more processors 1032 cause the one or more processors 1032 to perform operations. The training computing system 1030 can include a communication system 1039, similar to that of the vehicle computing system 112 and/or the operations computing system 106.

In some implementations, the training computing system 1030 can include one or more server computing devices. If the training computing system 1030 includes multiple server computing devices, such server computing devices can operate according to various computing architectures, including, for example, sequential computing architectures, parallel computing architectures, or some combination thereof.

In addition, or alternatively to the model(s) 1040 at the vehicle computing system 112 and/or the operations computing system 106, the training computing system 1030 can include one or more machine-learned models 1050. As examples, the machine-learned models 1050 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), or other forms of neural networks. The machine-learned models 1050 can be similar to and/or the same as the machine-learned models 1040.

As an example, the training computing system 1030 can communicate with the vehicle computing system 112 and/or the operations computing system 106 according to a client-server relationship. For example, the training computing system 1030 can implement the machine-learned models 1050 to provide a web service to the vehicle computing system 112 and/or the operations computing system 106. For example, the web service can provide machine-learned models to an entity associated with an autonomous vehicle; such that the entity can implement the machine-learned model (e.g., to determine predicted object trajectories, etc.). Thus, machine-learned models 1050 can be located and used at the vehicle computing system 112 and/or the operations computing system 106 and/or machine-learned models 1050 can be located and used at the training computing system 1030.

In some implementations, the training computing system 1030, the vehicle computing system 112, and/or the operations computing system 106 can train the machine-learned models 1040 and/or 1050 through use of a model trainer 1060. The model trainer 1060 can train the machine-learned models 1040 and/or 1050 using one or more training or learning algorithms. One example training technique is backwards propagation of errors. In some implementations, the model trainer 1060 can perform supervised training techniques using a set of labeled training data. In other implementations, the model trainer 1060 can perform unsupervised training techniques using a set of unlabeled training data. The model trainer 1060 can perform a number of generalization techniques to improve the generalization capability of the models being trained. Generalization techniques include weight decays, dropouts, or other techniques.

In particular, the model trainer 1060 can train a machine-learned model 1040 and/or 1050 based on a set of training data 1062. The training data 1062 can include, for example, a number of sets of data from previous events (e.g., previously obtained state data, previous obtain data associated with a geographic area). The training data 1062 can be associated with a previously observed trajectory of the object, which can allow the training data 1062 to train a model based on real-world object motion and the data associated therewith. In some implementations, the training data 1062 can be taken from the same geographic area (e.g., city, state, and/or country) in which an autonomous vehicle utilizing that model 1040/1050 is designed to operate. In this way, the models 1040/1050 can be trained to determine outputs (e.g., predicted future trajectories, one or more predicted future locations) in a manner that is tailored to the customs of a particular region. The model trainer 1060 can be implemented in hardware, firmware, and/or software controlling one or more processors.

The models 740/750 can be trained according to the loss functions described herein to determine a plurality of predicted trajectories for an object as well as one or more confidence levels (e.g., trajectory confidence levels, waypoint confidence levels).

In some implementations, the models 1040/1050 can be trained using one or more generative adversarial networks (GAN(s)). The GAN(s) can be utilized, for example, within an unsupervised machine learning environment. Moreover, such a training approach can include two networks: a generator network (e.g., a CNN such as the machine-learned prediction generator model 310 and/or the machine-learned motion model 320) and a discriminator network (e.g., a DNN such as the machine-learned discriminator model 330). A training dataset can be used to train the discriminator network (e.g., by presenting the training data to the network until it achieves certain accuracy). This training dataset can include training data such as, for example, one or more rasterized images, as described herein. During training, the generator network can aim to fool the discriminator network (e.g., to increase the error rate of the discriminator network). Backpropagation can be applied in the generator and discriminator networks so that the discriminator network becomes more skilled at distinguishing between the true data distribution and those produced by the generator network.

The network(s) 1080 can be any type of network or combination of networks that allows for communication between devices. In some embodiments, the network(s) 1080 can include one or more of a local area network, wide area network, the Internet, secure network, cellular network, mesh network, peer-to-peer communication link and/or some combination thereof and can include any number of wired or wireless links. Communication over the network(s) 1080 can be accomplished, for instance, via a network interface using any type of protocol, protection scheme, encoding, format, packaging, etc.

FIG. 10 illustrates one example system 1000 that can be used to implement the present disclosure. Other computing systems can be used as well. For example, in some implementations, the vehicle computing system 112 and/or the operations computing system 106 can include the model trainer 1060 and the training dataset 1062. In such implementations, the machine-learned models 1040 can be both trained and used locally at the vehicle computing system 112 and/or the operations computing system 106. As another example, in some implementations, the vehicle computing system 112 and/or the operations computing system 106 may not be connected to other computing systems.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for training a machine-learned model, the method comprising:
   receiving, by a computing system comprising one or more computing devices, a rasterized image associated with a training object;
   generating, by the computing system, a predicted trajectory of the training object by inputting the rasterized image into a machine-learned prediction generator model configured to output the predicted trajectory;
   converting, by the computing system, the predicted trajectory into a rasterized trajectory, wherein the rasterized trajectory spatially corresponds to the rasterized image;
   determining, by the computing system, a score for the predicted trajectory by inputting the rasterized trajectory and the rasterized image into a machine-learned discriminator model configured to output the score for the predicted trajectory;
   determining, by the computing system, an overall loss for the machine-learned prediction generator model based, at least in part, on the score; and
   training, by the computing system, the machine-learned prediction generator model by minimizing the overall loss for the machine-learned prediction generator model.

2. The computer-implemented method of claim 1, wherein the machine-learned prediction generator model and the machine-learned discriminator model are trained end-to-end via backpropagation based on the overall loss.

3. The computer-implemented method of claim 2, wherein the machine-learned discriminator model is trained at a discriminator learning rate and the machine-learned prediction generator model is trained at a prediction learning rate, wherein the discriminator learning rate is a higher multiple of the prediction learning rate.

4. The computer-implemented method of claim 3, further comprising:
determining, by the computing system, the discriminator learning rate based on a comparison between a threshold network loss and the overall loss.

5. The computer-implemented method of claim 3, wherein the discriminator learning rate is five times the prediction learning rate.

6. The computer-implemented method of claim 1, wherein the predicted trajectory comprises a plurality of waypoints, wherein each waypoint is indicative of a future location of the training object.

7. The computer-implemented method of claim 6, wherein converting the predicted trajectory into a rasterized trajectory comprises:
applying, by the computing system, a differentiable rasterizer to the predicted trajectory to transform the predicted trajectory into a same image space as the rasterized image.

8. The computer-implemented method of claim 7, wherein the rasterized image comprises a plurality of pixels and each pixel of the plurality of pixels corresponds to one or more coordinates of a three-dimensional area.

9. The computer-implemented method claim 8, wherein transforming the predicted trajectory into the same image space as the rasterized image comprises:
for each respective waypoint in the plurality of waypoints of the predicted trajectory:
determining, by the computing system, one or more coordinates of the three-dimensional area that correspond to the respective waypoint; and
assigning, by the computing system, the one or more coordinates to the respective waypoint.

10. The computer-implemented method of claim 1, wherein the rasterized image is received from a set of training data indicative of one or more previously observed objects.

11. The computer-implemented method of claim 10, wherein the set of training data comprises one or more ground truths indicative of a previously observed object trajectory; and
wherein the machine-learned discriminator model is previously trained to distinguish between generated trajectories and the one or more ground truths.

12. The computer-implemented method of claim 1, wherein the rasterized image comprises data indicative of one or more features of the training object, wherein the method further comprises:
determining, by the computing system, one or more predicted control inputs for the training object by inputting the rasterized image and the predicted trajectory into a machine-learned motion model configured to output one or more predicted control inputs based, at least in part, on the data indicative of the one or more features of the training object and the predicted trajectory, wherein the score for the predicted trajectory is based, at least in part, on the one or more predicted control inputs.

13. A computing system comprising:
one or more processors; and
one or more tangible, non-transitory, computer readable media that collectively store instructions that when executed by the one or more processors cause the computing system to perform operations comprising:
obtaining a rasterized image from a set of training data;
generating a predicted trajectory for a training object by inputting the rasterized image into a machine-learned prediction generator model;
converting the predicted trajectory into a rasterized trajectory, wherein the rasterized trajectory spatially corresponds to the rasterized image;
determining a score for the predicted trajectory by inputting the rasterized trajectory and the rasterized image into a machine-learned discriminator model configured to output the score for the predicted trajectory;
determining an overall for the machine-learned prediction generator model based, at least in part, on the loss score; and
training the machine-learned prediction generator model by minimizing the overall loss for the machine-learned prediction generator model.

14. The computing system of claim 13, wherein the rasterized image comprises data indicative of one or more features of the training object.

15. The computing system of claim 14, further comprising:
determining one or more predicted control inputs for the training object by inputting the rasterized image and the predicted trajectory into a machine-learned motion model configured to output the one or more predicted control inputs based, at least in part, on the data indicative of the one or more features of the training object and the predicted trajectory.

16. The computing system of 15, wherein the one or more predicted control inputs comprise at least one of a longitudinal acceleration or steering angle of the training object.

17. The computing system of claim 15, wherein the score for the predicted trajectory is based, at least in part, on the one or more predicted control inputs.

18. The computing system of claim 12, wherein the set of training data comprises data indicative of one or more previously observed objects.

19. A computing system, comprising:
a machine-learned prediction generator model configured to receive a rasterized image associated with a training object, and in response to receipt of the rasterized image, output a predicted trajectory of the training object;
a differential rasterizer configured to receive a predicted trajectory, and in response to receipt of the predicted trajectory, convert the predicted trajectory into a rasterized trajectory;
a machine-learned discriminator model configured to receive the rasterized trajectory and the rasterized image, and in response to receipt of the rasterized trajectory and rasterized image, output a score for the predicted trajectory;
a memory that stores a set of instructions; and
one or more processors which use the set of instructions to:
receive the rasterized image associated with the training object;
generate the predicted trajectory of the training object by inputting the rasterized image into the machine-learned prediction generator model;
convert the predicted trajectory into the rasterized trajectory by inputting the predicted trajectory into the differential rasterizer;
determine the score for the predicted trajectory by inputting the rasterized trajectory and the rasterized image into the machine-learned discriminator model;

determine an overall loss for the machine-learned prediction generator model based, at least in part, on the score; and train the machine-learned prediction generator model by minimizing the overall loss for the machine-learned prediction generator model.

20. The computing system of claim 19, wherein the rasterized image comprises data indicative of one or more features of the training object, wherein the computing system further comprises:

a machine-learned motion model configured to output one or more predicted control inputs based, at least in part, on the data indicative of the one or more features of the training object and the predicted trajectory; and wherein the one or more processors are further configured to:

determine one or more predicted control inputs for the training object by inputting the rasterized image and the predicted trajectory into the machine-learned motion model, wherein the score for the predicted trajectory is based, at least in part, on the one or more predicted control inputs.

* * * * *